USO05585950A

United States Patent [19]
Nishino et al.

[11] Patent Number: 5,585,950
[45] Date of Patent: Dec. 17, 1996

[54] STN LCD DEVICE DISPLAYING MULTIPLE COLORS IN RESPONSE TO DIFFERENT VOLTAGES WHICH INCLUDES A RETARDATION PLATE

[75] Inventors: Toshiharu Nishino, Hamura; Toshihiko Mori, Oome; Yasushi Nishida; Kazuyoshi Arai, both of Hachioji; Yukikazu Tanaka, Fussa; Hideshi Sato, Tokyo, all of Japan

[73] Assignee: Casio Computer Co., Ltd., Tokyo, Japan

[21] Appl. No.: 223,219

[22] Filed: Apr. 5, 1994

[30] Foreign Application Priority Data

| Apr. 12, 1993 | [JP] | Japan | 5-084760 |
| May 31, 1993 | [JP] | Japan | 5-128958 |
| Jul. 8, 1993 | [JP] | Japan | 5-168798 |
| Nov. 19, 1993 | [JP] | Japan | 5-290847 |

[51] Int. Cl.$^6$ .................... G02F 1/1341; G02F 1/1335
[52] U.S. Cl. .................. 349/118; 345/88; 349/74; 349/101
[58] Field of Search ................ 359/53, 73, 57, 359/59, 93; 345/88, 89

[56] References Cited

U.S. PATENT DOCUMENTS

| 4,917,465 | 4/1990 | Conner et al. | 359/53 |
| 5,179,457 | 1/1993 | Hirataka et al. | 359/73 |
| 5,184,237 | 2/1993 | Iimura et al. | 359/63 |
| 5,191,454 | 3/1993 | Iijima et al. | 359/93 |
| 5,194,975 | 3/1993 | Akatsuka et al. | 359/73 |
| 5,235,450 | 10/1993 | Yoshimura et al. | 359/73 |
| 5,245,451 | 9/1993 | Wu et al. | 359/55 |
| 5,245,456 | 9/1993 | Yoshimi et al. | 359/73 |
| 5,249,071 | 9/1993 | Yoshimizu et al. | 359/63 |

FOREIGN PATENT DOCUMENTS 1238617  9/1989  Japan .

*Primary Examiner*—Anita Pellman Gross
*Assistant Examiner*—Toan Ton
*Attorney, Agent, or Firm*—Frishauf, Holtz, Goodman, Langer & Chick

[57] ABSTRACT

A pair of polarizing plates are disposed on two sides of an STN type liquid crystal cell constituted by a liquid crystal twist-aligned at a twist angle of 180° to 270°. A retardation plate is disposed between one of the polarizing plates and the liquid crystal cell in such a manner that the optical axis of the retardation plate crosses the transmission axis of the adjacent polarizing plate at 35° to 55°. The pair of polarizing plates are arranged such that their transmission axes are parallel to each other. The liquid crystal cell is arranged such that the optical axis of the retardation plate crosses the aligning direction of the liquid crystal molecules on the substrate side adjacent to the retardation plate at a predetermined angle. A driving circuit is connected to the liquid crystal cell. This circuit serves to apply a voltage to the liquid crystal in accordance with display data having color information to change the polarized state of elliptically polarized light transmitted through the liquid crystal to change the color of emerging light.

25 Claims, 25 Drawing Sheets

STN LCD DEVICE DISPLAYING MULTIPLE COLORS IN RESPONSE TO DIFFERENT VOLTAGES WHICH INCLUDES A RETARDATION PLATE

BACKGROUND OF THE INVENTION

1. Field of the Invention

The present invention relates to a color liquid crystal display apparatus for performing a color display operation using the birefringence characteristics of a twisted-nematic liquid crystal.

2. Description of the Related Art

As a conventional display apparatus for a television set, a personal computer, an electronic portable calculator, or the like, a liquid crystal display apparatus is well known. Recently, color liquid crystal display apparatuses capable of performing a chromatic display, such as a liquid crystal color television set and the color display of a computer terminal, have been widely used.

As a color liquid crystal display apparatus, a transmission type color liquid crystal display apparatus is generally used. In this apparatus, a liquid crystal cell is sandwiched between a pair of polarizing plates, and a back light (illumination source) is disposed outside one of the polarizing plates. In this case, the liquid crystal cell is formed as follows. A pair of transparent substrates are disposed to oppose each other. Transparent electrodes are respectively formed on the opposing surfaces of the transparent substrates. A liquid crystal is then sealed between the transparent substrates. Color filters for selectively transmitting light components having specific wavelengths are disposed on one of the transparent substrates.

By ON/OFF-controlling the driving voltage applied between the pair of transparent substrates, the emergence of light from the back light is controlled. Light from the back light is selectively transmitted through each color filter in the liquid crystal display apparatus in the processing of passing therethrough. As a result, the transmitted light has a specific color. With the colored light transmitted through each color filter, a color display is performed.

A color filter, however, generally has a low transmittance. For this reason, in a color liquid crystal display apparatus using the above-mentioned color filters, the loss of transmitted light is large, resulting in a dark display. Especially, in a reflection type liquid crystal display apparatus widely used as the display portion of an electronic portable calculator or a portable device such as a wristwatch, no special light source is arranged, and light is transmitted through each color filter twice before and after reflection and undergoes optical loss. Therefore, the resultant display becomes dark. That is, it is very difficult to perform a color display operation by using color filters.

In addition, a color filter demands high precision in dimensions, e.g., thickness, and in assembly, similar to other optical elements such as a polarizing plate, resulting in an increase in cost of the liquid crystal display apparatus.

Furthermore, in a color liquid crystal display apparatus using color filters, since one pixel can display only a color corresponding to the color of a color filter arranged for this pixel, one display dot must be constituted by a plurality of pixels having color filters of different colors to display a plurality of colors. Therefore, in order to display many colors, a large number of pixels are required. As a result, the structure of the color liquid crystal display apparatus is complicated. Especially, when a multiple color display operation is to be performed by a dot matrix display type apparatus having a large number of display dots, the apparatus inevitably has a more complicated structure.

SUMMARY OF THE INVENTION

It is an object of the present invention to provide a color liquid crystal display apparatus having a simple structure, which performs coloring of transmitted light without using any color filter, can sufficiently increase the brightness of a display by increasing the transmittance, and can display a plurality of colors with one display dot.

In order to achieve the above object, according to the present invention, there is provided a color liquid crystal display apparatus comprising a pair of substrates, electrodes respectively formed on the opposing surfaces, and aligning films respectively formed to cover the electrodes, the aligning films having undergone aligning treatment in predetermined directions, a liquid crystal layer formed between the pair of substrates and having liquid crystal molecules aligned to be twisted at a twist angle of 180° to 270° from one substrate to the other substrate, a pair of polarizing plates disposed outside the pair of substrates to sandwich the substrates and respectively having transmission axes for linearly polarizing incident light, a retardation plate disposed between the pair of polarizing plates such that an angle defined by a direction, in which a refractive index is the maximum within a planar direction of the retardation plate, and the transmission axis of an adjacent one of the polarizing plates is 35° to 55°, and driving means, connected to the electrodes, for changing a voltage applied to the liquid crystal layer to change a polarized state of light transmitted through the liquid crystal layer so as to change a color of light transmitted through the polarizing plate on an exit side.

According to the color liquid crystal display apparatus having the above-described arrangement, when light is transmitted through the incident-side polarizing plate, the light becomes linearly polarized light. When this linearly polarized light is transmitted through the retardation plate and the liquid crystal layer, light components having different wavelengths (to be referred to as wavelength components hereinafter) become elliptically polarized light components in different states. Of the elliptically polarized wavelength components in the different states, components (to be referred to as transmission axis component light hereinafter) transmitting along the transmission axis of the exit-side polarizing plate emerge from the exit-side polarizing plate. Therefore, the emerging light which is transmitted through the exit-side polarizing plate exhibits the color of a wavelength component having transmission axis component light whose intensity is high. In this case, the respective wavelength components transmitted through the liquid crystal layer respectively change their elliptically polarized states in accordance with the aligned state of the molecules of the liquid crystal layer. Therefore, when the aligned state of the liquid crystal molecules is changed by changing the voltage applied to the liquid crystal layer, the elliptically polarized states of the respective wavelength components are changed, thereby changing the color of emerging light.

In the above color liquid crystal display apparatus, if the twist angle of the liquid crystal molecules is set to be 250° to 260°, a display pattern of a dot matrix type can be easily driven by a high time-division scheme.

In the above-described color liquid crystal display apparatus, two retardation plates may be arranged. In this case, the two retardation plates may be disposed on one side of the liquid crystal cell formed by sealing a liquid crystal between a pair of substrates, or may be respectively disposed on the two sides of the liquid crystal cell. A reflection plate may be provided for the color liquid crystal display apparatus to use the apparatus as a reflection type liquid crystal display apparatus. In this case, two retardation plates may also be disposed on one side of the liquid crystal cell or may be respectively disposed on the two sides thereof.

As a retardation plate used for the above-described color liquid crystal display apparatus, a so-called biaxial retardation plate may be used. The biaxial retardation plate used in the present invention is a retardation plate which satisfies $n_X > n_Z > n_Y$ where $n_X$ is the refractive index in a direction X in which the refractive index is the maximum within a plane including the retardation plate, $n_Y$ is the refractive index in a direction perpendicular to the direction X in the plane including the retardation plate, and $n_Z$ is the refractive index in the direction of thickness. With the use of this retardation plate, a larger viewing angle can be obtained.

In the above color liquid crystal apparatus, electrodes may be formed on the respective substrates to extend in orthogonal directions so that the intersecting/opposing portions between the electrodes serve as pixels, thereby forming a dot matrix type display pattern. The waveform of a driving voltage applied to each dot matrix type electrode may be formed by selecting a driving voltage from a plurality of voltages of different magnitudes in accordance with display data including color information.

Furthermore, the above color liquid crystal display apparatus may be designed as an active matrix type color liquid crystal display apparatus of a TFT driving scheme, in which a plurality of pixel electrodes are regularly arranged on a substrate on one side of a liquid crystal cell, and thin-film transistors, each constituted by a source electrode connected to a pixel electrode, a drain electrode connected to a signal line for supplying a display signal, and a gate electrode connected to a scanning line for supplying a scanning signal, are respectively arranged, as switching elements, for the pixel electrodes.

Furthermore, the apparatus may include an applied voltage control means, in a liquid crystal driving means, in which a predetermined number of frame times in a time-division driving operation constitute one period, and a signal voltage in each period is formed by combining a plurality of signal voltages in each frame in accordance with the color data of a display signal, thereby displaying a large number of halftone colors.

In order to achieve the above object, according to the present invention, there is provided another color liquid crystal display apparatus comprising a pair of substrates, electrodes respectively formed on the opposing surfaces, and aligning films respectively formed to cover the electrodes, the aligning films having undergone aligning treatment in predetermined directions, a liquid crystal layer formed between the pair of substrates and having liquid crystal molecules aligned to be twisted at a twist angle of 180° to 270° from one substrate to the other substrate, a polarizing plate disposed outside one of the pair of substrates and having a transmission axis for linearly polarizing incident light, a reflection plate disposed on an opposite side to the polarizing plate with respect to the pair of substrates, a retardation plate disposed between the polarizing plate and the reflection plate such that an angle defined by a direction, in which a refractive index is the maximum within a planar direction of the retardation plate, and a transmission axis of the polarizing plate is 35° to 55°, and driving means for changing a voltage applied to the liquid crystal layer to change a polarized state of light transmitted through the liquid crystal layer so as to change a color of light transmitted through the polarizing plate on an exit side.

According to this reflection type color liquid crystal display apparatus, one polarizing plate serves as both an incident-side polarizing plate and an exit-side polarizing plate so that the same functions and effects as those of the above-described color liquid crystal display apparatus can be obtained.

In the above reflection type color liquid crystal display apparatus, if the twist angle of the liquid crystal molecules is set to be 250° to 260°, a display pattern of a dot matrix type can easily driven by a high time-division scheme.

Two retardation plates may be arranged in the above-described reflection type color liquid crystal display apparatus. In this case, the two plates may be disposed on one side or may be respectively disposed on two sides of the liquid crystal cell.

As a retardation plate used for the reflection type color liquid crystal display apparatus, the above-described biaxial retardation plate may be used. With the use of this biaxial retardation plate, an increase in viewing angle can be achieved.

In the above reflection type color liquid crystal apparatus, electrodes may be formed on the respective substrates to extend in orthogonal directions so that the intersecting/opposing portions between the electrodes serve as pixels, thereby forming a dot matrix type display pattern. The waveform of a driving voltage applied to each dot matrix type electrode is formed by selecting a driving voltage from a plurality of voltages of different magnitudes in accordance with display data including color information.

Furthermore, the above reflection type color liquid crystal display apparatus may be designed as an active matrix type color liquid crystal display apparatus of a TFT driving scheme, in which a plurality of pixel electrodes are regularly arranged on a substrate on one side of a liquid crystal cell, and thin-film transistors, each constituted by a source electrode connected to a pixel electrode, a drain electrode connected to a signal line for supplying a display signal, and a gate electrode connected to a scanning line for supplying a scanning signal, are respectively arranged, as switching elements, for the pixel electrodes.

In order to achieve the above object, in addition to the above two color liquid crystal display apparatuses according to the present invention, there is also provided still another color liquid crystal display apparatus comprising a pair of substrates, electrodes respectively formed on the opposing surfaces, and aligning films respectively formed to cover the electrodes, the aligning films having undergone aligning treatment in predetermined directions, a liquid crystal layer formed between the pair of substrates and having liquid crystal molecules aligned to be twisted at a twist angle of 180° to 270° from one substrate to the other substrate, a pair of polarizing plates arranged outside the pair of substrates to sandwich the substrates and respectively having transmission axes for linearly polarizing incident light, a retardation plate, arranged to be adjacent to the incident-side polarizing plate of the pair of polarizing plate, for elliptically polarizing linearly polarized light which is transmitted through the polarizing plate, and liquid crystal driving means for changing a voltage applied to the liquid crystal layer to at least three levels to change the polarized state of light transmitted through the liquid crystal layer so as to change a display color to at least three colors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will be described below with reference to FIGS. 1 to 30.

FIRST EMBODIMENT

Figure 1:
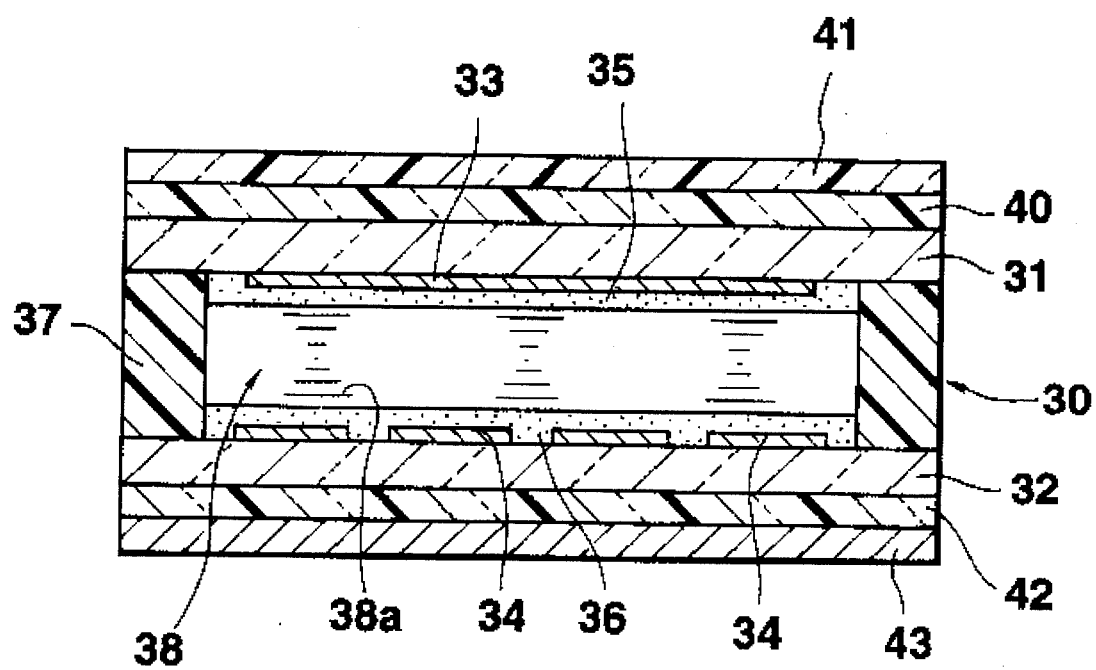
FIG. 1 is a sectional view showing a color liquid crystal display apparatus according to the first embodiment of the present invention.

As shown in FIG. 1, a color liquid crystal display apparatus according to the first embodiment of the present invention is a reflection type liquid crystal display apparatus, which is designed such that a pair of polarizing plates 41 and 42 are disposed to sandwich a liquid crystal cell 30, while one retardation plate 40 is disposed between the liquid crystal cell 30 and one polarizing plate (the upper polarizing plate shown on the upper side in this embodiment) 41, and a reflection plate 43 is disposed on the side (outer side) of the polarizing plate 42 opposite to the side which is in contact with the liquid crystal cell 30.

The liquid crystal cell 30 is of an STN (super twisted-nematic) type. More specifically, the liquid crystal cell 30 is formed as follows. Transparent electrodes 33 and 34 are respectively formed on a pair of upper and lower transparent substrates 31 and 32. Aligning films 35 and 36 are formed on the transparent electrodes 33 and 34, respectively. The pair of transparent substrates 31 and 32 are joined to each other through a frame-like seal member 37 such that the surfaces on which the aligning films 35 and 36 are formed are located inside. A liquid crystal 38 is then sealed in the space enclosed within the aligning films 35 and 36 and the seal member 37. The aligning films 35 and 36 have undergone an aligning treatment in predetermined directions, respectively, by a rubbing method or the like. Liquid crystal molecules 38a adjacent to the aligning films 35 and 36 are aligned along the directions of the aligning treatment, respectively, so that the molecules 38a of the whole liquid crystal layer 38 are arranged to be twisted, from the lower substrate 32 to the upper substrate 31, at a twist angle corresponding to the intersection angle of the aligning directions. The present invention uses an STN type liquid crystal cell in which the liquid crystal molecules 38a are aligned at a twist angle of about 180° to 270°.

The retardation plate 40 is disposed such that its optical axis (phase advance or phase delay axis) which is the long axis direction of each material molecule and along which the refractive index is the maximum obliquely crosses the liquid crystal molecule aligning direction on the substrate (upper substrate) 31 side adjacent to the retardation plate of the liquid crystal cell 30 at a predetermined angle. The pair of polarizing plates 41 and 42 are disposed such that their transmission axes obliquely cross the optical axis of the retardation plate 40 at predetermined angles, respectively.

Figure 2:
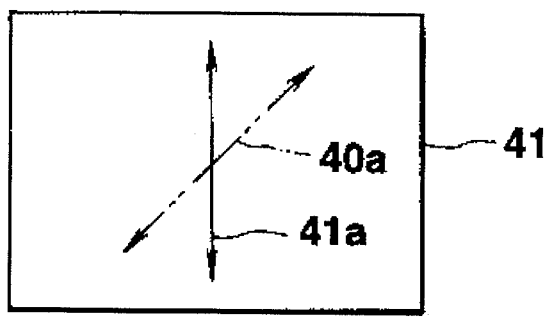
FIG. 2 is a view for explaining the optical arrangement of the respective optical elements in the first embodiment.
Figure 2:
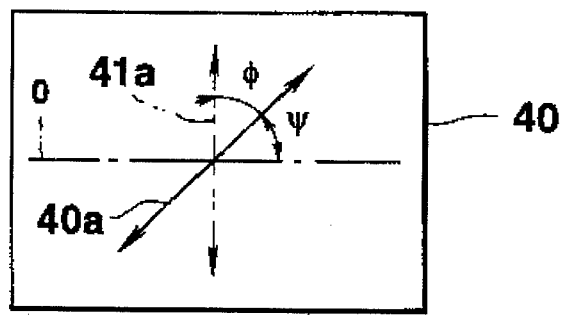
Figure 2:
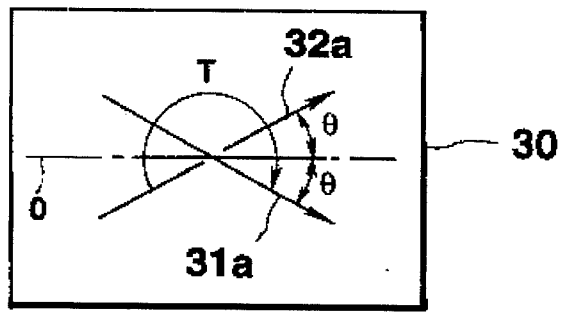
Figure 2:
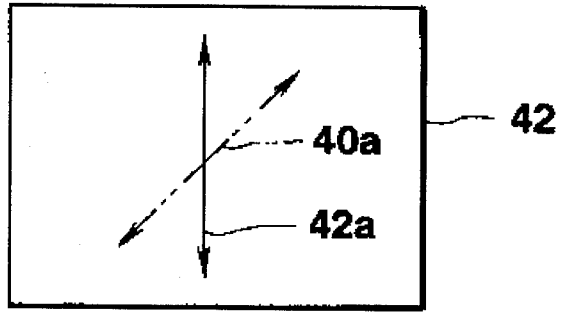

FIG. 2 is a plan view showing the liquid crystal molecule aligning directions of the liquid crystal cell 30, the optical axis of the retardation plate 40, and the transmission axes of the pair of polarizing plates 41 and 42 in the liquid crystal display apparatus. Note that the illustration of the reflection plate 43 is omitted in this plan view and in the subsequent similar plan views. Referring to FIG. 2, reference numeral 31a denotes the liquid crystal molecule aligning direction of the liquid crystal cell 30 on the upper substrate 31 side; and 32a, the liquid crystal molecule aligning direction of the liquid crystal cell 30 on the lower substrate 32 side.

As shown in FIG. 2, the liquid crystal molecule aligning directions 31a and 32a of the liquid crystal cell 30 on the two substrate (31 and 32) sides are tilted with respect to a reference line (horizontal line in FIG. 2) O in opposite directions by a predetermined angle θ, respectively. With this arrangement, the molecules 38a of the liquid crystal 38 are twisted from the lower substrate 32 side to the upper substrate 31 side, as indicated by an arrow T in FIG. 2, which shows the twist-aligning direction.

In this embodiment, the liquid crystal cell 30 is designed such that the angle θ between each of the liquid crystal molecule aligning directions 31a and 32a and the reference line O is 30°, and the liquid crystal molecules 38a are twist-aligned at an angle of 240°.

In addition, referring to FIG. 2, reference numeral 40a denotes an optical axis of the retardation plate 40; 41a, a transmission axis of the upper polarizing plate 41; and 42a, a transmission axis of the lower polarizing plate 42.

In this embodiment, the optical axis 40a is caused to obliquely cross the reference line O at a predetermined inclination angle ψ. Therefore, the optical axis 40a of the retardation plate 40 and the liquid crystal molecule aligning direction 31a on the substrate 31 side adjacent to the retardation plate cross each other at an angle (ψ−θ°).

Furthermore, in the embodiment, the transmission axes 41a and 42a of the polarizing plates 41 and 42 are set to be almost parallel to each other, and also obliquely cross the optical axis 40a of the retardation plate 40 at 45°.

A coloring effect obtained by the color liquid crystal display apparatus having the above-described arrangement will be described below. External light (natural light or light from an illumination source) is linearly polarized by the upper polarizing plate 41 and incident on the retardation plate 40 whose optical axis 40a crosses the transmission axis 41a of the polarizing plate 41 at about 45°. In the process of passing through the retardation plate 40, the light is polarized in accordance with a retardation value indicating the magnitude of the birefringent effect of the retardation plate 40 to become elliptically polarized light. In this case, respective wavelength components are set in different elliptically polarized states.

The elliptically polarized light emerging from the retardation plate 40 is transmitted through the liquid crystal cell 30. Since the liquid crystal 38 whose liquid crystal molecules are twist-aligned has birefringence, when the light is transmitted through the twist-aligned liquid crystal 38, it is influenced by the birefringent effect. As a result, the elliptically polarized state of the transmitted light changes. When this elliptically polarized light is incident on the lower polarizing plate 42, only light components, of the light components having various wavelengths in different elliptically polarized states, which transmit along the transmission axis 42a emerge from the lower polarizing plate 42. In this case, since the intensity of the emerging light is proportional to the square of a value (transmission axis component light) obtained by projecting the, amplitude of the elliptically polarized light component of each wavelength component on the transmission axis, the color of the emerging light is substantially the same as that of a wavelength component which has a large transmission axis component light.

A color changing effect of the color liquid crystal display apparatus of this embodiment will be described next. Incident light which is transmitted through the upper polarizing plate 41 to be linearly polarized is elliptically polarized upon receiving birefringent effects in the process of passing through the retardation plate 40 and the liquid crystal cell 30. The aligned state of the liquid crystal molecules 38a of the liquid crystal cell 30 changes in accordance with an applied voltage, and the magnitude of the birefringent effect changes accordingly. Therefore, upon changing the voltage applied to the liquid crystal cell 30, the magnitude of the birefringent effect of the liquid crystal cell 30 changes. Hence, the elliptically polarized state of light transmitted through the liquid crystal cell 30 also changes. As a result, the color of emerging light transmitted through the lower polarizing plate 42 changes.

The magnitude of the birefringent effect of the liquid crystal cell 30 is determined by a value Δn·d (the product of a refractive index anisotropy Δn and a liquid crystal layer thickness d of the liquid crystal 38), and the refractive index anisotropy Δn varies depending on the aligned state of the liquid crystal molecules 38a. Therefore, when the voltage applied to the liquid crystal 38 is changed, the aligned state of the liquid crystal molecules 38a changes, and hence the value Δn·d, i.e., the magnitude of the refractive index anisotropy Δn, of the liquid crystal cell 30 changes.

While no voltage is applied between the electrodes 33 and 34 of the liquid crystal cell 30, the twist angle of the liquid crystal molecules 38a is 240°. Elliptically polarized light incident on the liquid crystal 38 receives a polarizing effect based on a birefringent effect corresponding to the aligned state of the liquid crystal 38. As a result, the elliptically polarized state of the light changes. The elliptically polarized light which has received the polarizing effects of both the retardation plate 40 and the liquid crystal cell 30 is transmitted through the lower polarizing plate 42. As a result, emerging light having a predetermined color can be obtained.

As the voltage applied between the electrodes 33 and 34 of the liquid crystal cell 30 is increased, the liquid crystal molecules 38a are raised/aligned from the twist-aligned state. The magnitude of the birefringent effect of the liquid crystal cell 30 changes in accordance with a change in the aligned state of the liquid crystal molecules 38a. Therefore, the elliptically polarized state of the transmitted light which has received the polarizing effects of both the retardation plate 40 and the liquid crystal cell 30 changes. As a result, the color of the colored light also changes.

As the applied voltage is further increased, the liquid crystal molecules 38a are raised almost vertically with respect to the surfaces of the substrates 31 and 32, and the polarizing effect of the liquid crystal cell 30 is almost nullified. As a result, light transmitted through the lower polarizing plate 42 becomes light which is colored by only the polarizing effect of the retardation plate 40 described above.

As described above, the magnitude of the birefringent effect of the liquid crystal cell 30 is expressed by the value Δn·d. The refractive index anisotropy Δn of the liquid crystal 38 decreases and the value Δn·d of the liquid crystal cell 30 decreases as the liquid crystal molecules 38a are raised/aligned upon application of a voltage.

When a voltage for raising/aligning the liquid crystal molecules 38a vertically is applied to the liquid crystal cell 30, the retardation of the liquid crystal cell 30 becomes "0", and the polarizing effect of the liquid crystal cell 30 is nullified. For this reason, elliptically polarized light emerging from the retardation plate 40 is transmitted through the liquid crystal cell 30 without being polarized, and is incident on the lower polarizing plate 42. The light which is transmitted through the lower polarizing plate 42 is colored by only the polarizing effect of the retardation plate 40.

The light transmitted through the lower polarizing plate 42 is reflected by the reflection plate 43 to emerge from the upper surface side of the display apparatus in a reverse optical path to that described above. As a result, a display with the color of the emerging light can be obtained.

According to the above-described liquid crystal display apparatus, therefore, transmitted light can be colored without using any color filter, and the brightness of the display can be sufficiently increased by increasing the transmittance.

In the conventional color liquid crystal display apparatus using color filters, the amount of colored light transmitted through a color filter is considerably reduced. In the color liquid crystal display apparatus of the present invention, such a reduction in light amount hardly occurs. For this reason, even if the color liquid crystal display apparatus of this embodiment is of a reflection type, the brightness of a display is sufficient.

In a color liquid crystal display apparatus using color filters, a display color is determined by the color of a color filter. In contrast to this, in the color liquid crystal display apparatus of the above embodiment, colored light based on the polarizing effect of the retardation plate 40 and colored light based on the polarizing effects of both the retardation plate 40 and the liquid crystal cell 30 can be obtained. In addition, since the color of the colored light based on the polarizing effects of both the retardation plate 40 and the liquid crystal cell 30 changes in accordance with the voltage applied to the liquid crystal cell 30, the display color can be arbitrarily changed.

Tables 1 to 4 respectively show display modes of the above color liquid crystal display apparatus. Note that all the numerical values in each table are approximate values, and the value of each applied voltage is an RMS. In addition, each display color is one observed when the display of the liquid crystal display apparatus is viewed from the vertical direction.

TABLE 1

| Retardation of Retardation Plate | $\psi$ | Liquid Crystal Cell | | | Display Color |
|---|---|---|---|---|---|
| | | Twist Angle | $\Delta n \cdot d$ | Applied Voltage | |
| 1240 nm | 45° | 240° | 842 nm | 0.1 V or less | Blue |
| | | | | 1.3 to 1.6 V | Green |
| | | | | 2.0 V or more | Red |

$(\psi - \theta = 15°)$

TABLE 2

| Retardation of Retardation Plate | $\psi$ | Liquid Crystal Cell | | | Display Color |
|---|---|---|---|---|---|
| | | Twist Angle | $\Delta n \cdot d$ | Applied voltage | |
| 930 nm | 45° | 240° | 842 nm | 0.4 V or less | Brown |
| | | | | 1.7 to 2.5 V | Blue |
| | | | | 3.0 V or more | Green |

$(\psi - \theta = 15°)$

TABLE 3

| Retardation of Retardation Plate | $\psi$ | Liquid Crystal Cell | | | Display Color |
|---|---|---|---|---|---|
| | | Twist Angle | $\Delta n \cdot d$ | Applied Voltage | |
| 930 nm | 60° | 240° | 842 nm | 0.2 V or less | White |
| | | | | 1.3 to 2.2 V | Blue |
| | | | | 3.0 V or more | Green |

$(\psi - \theta = 30°)$

TABLE 4

| Retardation of Retardation Plate | $\psi$ | Liquid Crystal Cell | | | Display Color |
|---|---|---|---|---|---|
| | | Twist Angle | $\Delta n \cdot d$ | Applied Voltage | |
| 1350 nm | 45° | 240° | 842 nm | 0.2 V or less | Blue |
| | | | | 1.25 to 1.45 V | Green |
| | | | | 1.5 to 1.9 V | White |
| | | | | 2.2 V or more | Red |

$(\psi - \theta = 15°)$

As shown in Tables 1 to 4, the above color liquid crystal display apparatus can perform a display operation with at least three colors by controlling the voltage applied to the liquid crystal cell 30. Especially in the mode shown in Table 4, a display operation can be performed with four colors.

A case wherein the four-display-color liquid crystal display apparatus shown in Table 4 is applied to an electronic portable calculator of a dot matrix display scheme will be described next.

In a liquid crystal display apparatus of a dot matrix type, a plurality of electrodes 33 are formed on one substrate 31 to extend parallel to each other in a predetermined direction, and a plurality of electrodes 34 are formed on the other substrate 32 to extend parallel to each other in a direction perpendicular to the electrodes 33 on the opposite side. With this arrangement, pixels constituted by the intersecting/opposing portions of the electrodes 33 and 34 on the two sides are arranged in the form of a matrix.

Figure 3:
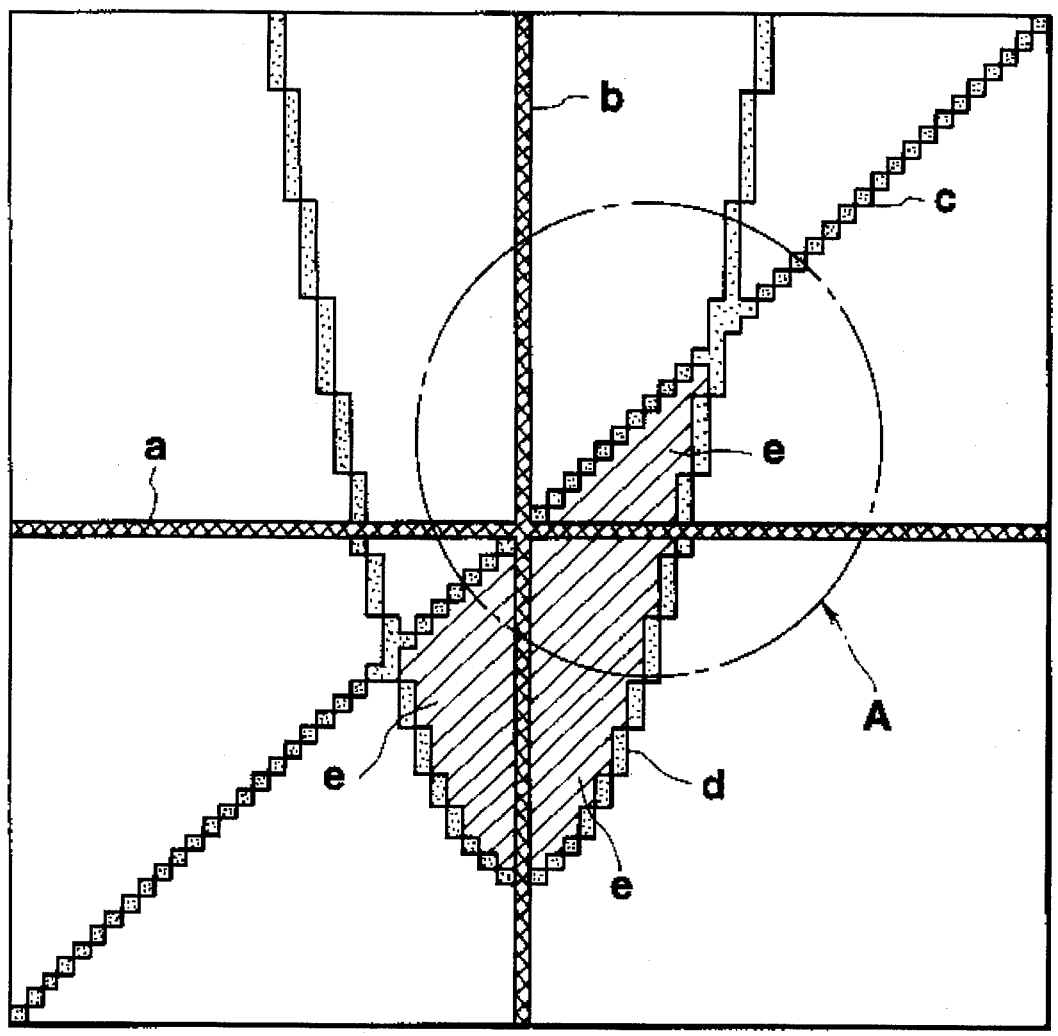
FIG. 3 is a view for explaining a display pattern displayed by the color liquid crystal display apparatus of the first embodiment.
Figure 4:
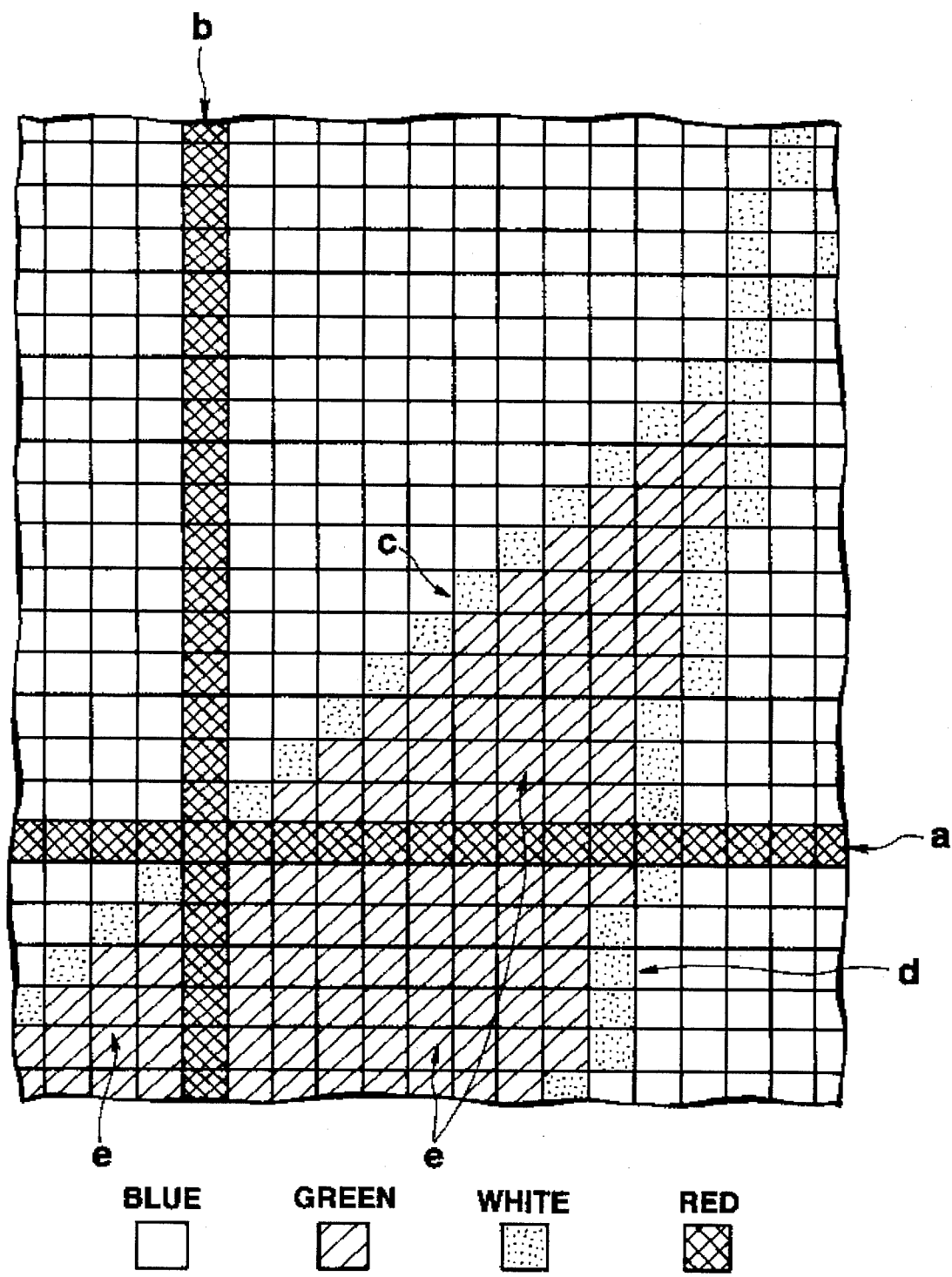
FIG. 4 is a view showing the details of a portion A in FIG. 3.
Figure 5:
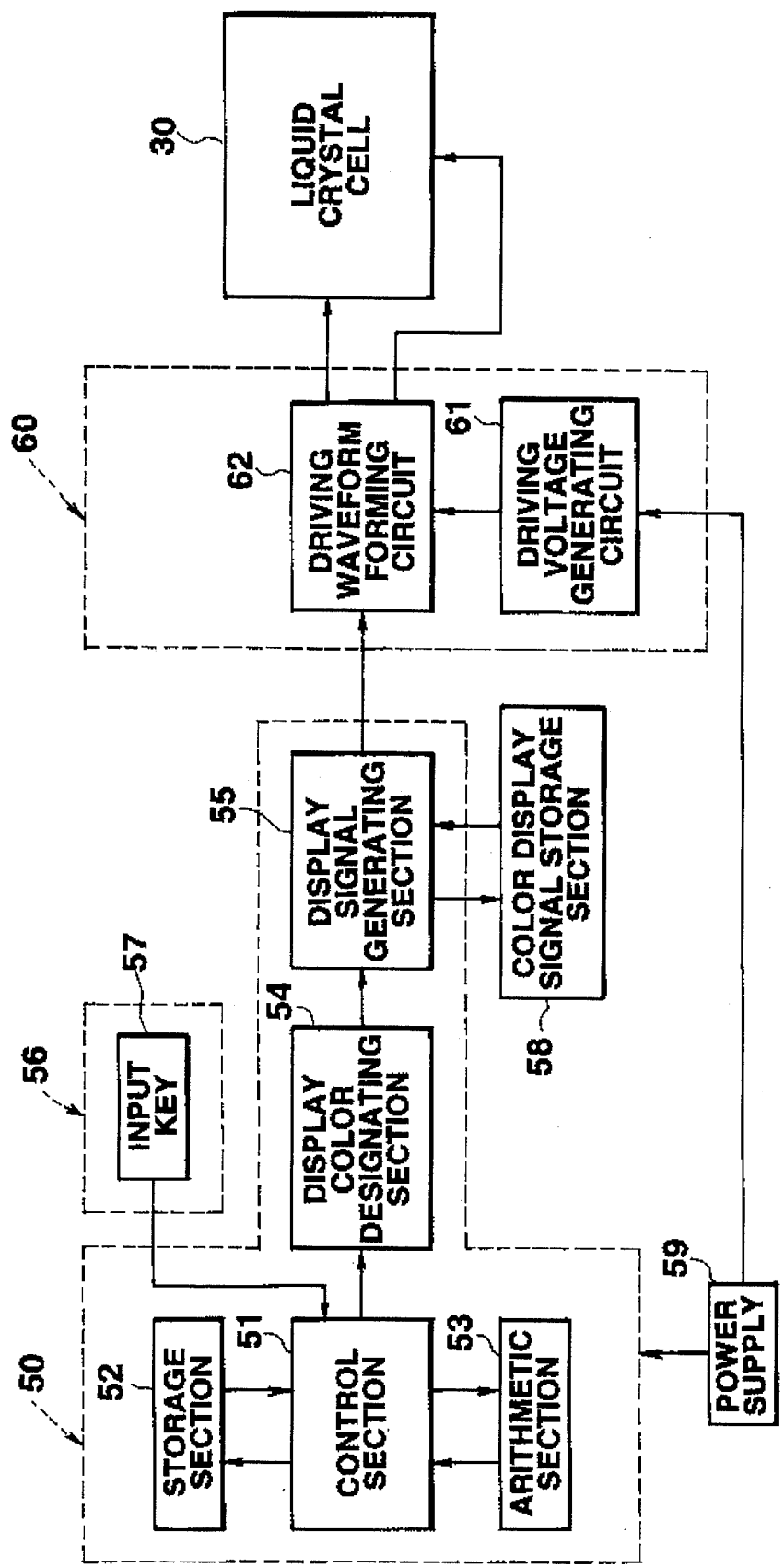
FIG. 5 is a block diagram showing a liquid crystal driving circuit in an application of the first embodiment.

FIGS. 3 and 4 show a case wherein the above color liquid crystal display apparatus is applied to the display apparatus of an electronic portable calculator having a graph display function. FIG. 3 shows a state wherein a graph is displayed. FIG. 4 is an enlarged view of a portion A in FIG. 3. FIG. 5 is a block diagram showing the circuit arrangement of the portable calculator.

In the display sample shown in FIG. 3, curves represented by the following two functions are displayed:

$$y < cx + b \quad (1)$$

$$y^2 > ax^2 + b \quad (2)$$

In this case, x- and y-axes a and b are displayed in "red"; a linear curve (straight line) c represented by function (1) and a quadratic curve d represented by function (2), "white"; a region e satisfying two functions (1) and (2), "green"; and the remaining region, i.e., the background, "blue".

This display pattern is displayed by controlling the display color of each pixel. More specifically, referring to FIG. 4, which is the enlarged view of the portion A in FIG. 3, each square represents a pixel. In this case, the x- and y-axes a and b are displayed upon controlling the color of each of the corresponding display pixels: to be "red"; the linear curve (straight line) c represented by function (1) and the quadratic curve d represented by function (2) are displayed upon controlling the color of each of the corresponding display pixels to be "white"; the region e satisfying two functions (1) and (2) is displayed upon controlling the color of each of the corresponding display pixels to be "green"; and the background is displayed upon controlling the color of each of the corresponding display pixels to be "blue".

The circuit arrangement of the electronic portable calculator, which performs the above display operation, will be described next. As shown in FIG. 5, the circuit of this calculator is constituted by an electronic portable calculator circuit section 50, a key input section 56, a color display signal storage section 58, a display driving circuit 60 for the liquid crystal cell 30, and a power supply 59 for these components.

In the electronic portable calculator circuit section 50, numerical values and an arithmetic expression using variables which are input from the key input section 56 upon operation of input keys 57 are supplied to a control section 51 and stored in a storage section 52. The control section 51 causes an arithmetic section 53 to perform arithmetic processing of the numerical values in accordance with the arithmetic expression, and causes the storage section 52 to store the arithmetic processing result. In addition, the control section 51 supplies the result to a display color designating section 54. The display color designating section 54 performs color designation for a graph display with respect to the x-y coordinate points and regions on the basis of the arithmetic processing result. The display color designating section 54 then outputs the result, as data whose display colors are designated, to a display signal generating section 55.

The color display signal storage section 58 serves to store color display signals corresponding to the above-mentioned plurality of display colors (blue, green, white, and red). The display signal generating section 55 reads out a predetermined color display signal from the color display signal storage section 58 in accordance with the data supplied from the display color designating section 54, and generates a display signal including color information.

The display driving circuit 60 comprises a driving voltage generating circuit 61 and a driving waveform forming circuit 62. The driving voltage generating circuit 61 generates a voltage required to form a driving waveform for the liquid crystal cell 30 and a plurality of different voltages corresponding to the respective display colors from a voltage applied from the power supply 59, and applies these voltages to the driving waveform forming circuit 62.

The display signal generated in accordance with the arithmetic processing result is supplied from the display signal generating section 55 of the electronic portable calculator circuit section 50 to the driving waveform forming circuit 62. The driving waveform forming circuit 62 generates a plurality of scanning electrode applied voltages having different waveforms, which voltages are used to time-divisionally drive the liquid crystal cell 30 at a duty ratio corresponding to the number of scanning electrodes 33 of the pixels arranged in the form of a matrix, and combines a plurality of voltages applied from the driving voltage generating circuit 61 on the basis of the display signal, thus generating a signal electrode applied voltage having a waveform corresponding to a voltage value large enough to operate the liquid crystal 38 between the electrodes 33 and 34 of the liquid crystal cell 30. In addition, the driving waveform forming circuit 62 sequentially applies the scanning electrode applied voltages to the scanning electrodes 33, and synchronously applies the signal electrode applied voltage to each signal electrode 34, thereby time-divisionally driving the liquid crystal cell 30.

A driving operation of the liquid crystal cell 30 will be described below with reference to a case wherein the graph showing the curves represented by two functions (1) and (2) is displayed. When two functions (1) and (2) and a graph display command are input from the key input section 56, the control section 51 of the electronic portable calculator circuit section 50 causes the arithmetic section 53 to perform arithmetic processing of these functions, and supplies the resultant graph display data to the display color designating section 54. The display color designating section 54 designates the display colors of this graph display data, i.e., the display colors of the x-y coordinate points and the region satisfying conditions represented by the functions, as follows: "red" for the x- and y-axes a and b; "white" for the linear curve c represented by function (1) and the quadratic curve d represented by function (2); "green" for the region e satisfying two functions (1) and (2); and "blue" for the remaining region.

The graph display data whose display colors are designated is supplied to the display signal generating section 55. The display signal generating section 55 reads out a/predetermined color display signal from the color display signal storage section 58, generates a display signal including color information, and supplies the display signal to the driving waveform forming circuit 62 of the display driving circuit 60.

Upon reception of this display signal, the driving waveform forming circuit 62 selects a voltage corresponding to the color information of the display signal from a plurality of different voltages (V1, V2, V3, and V4 in Table 4) applied from the driving voltage generating circuit 61, and forms a scanning electrode applied voltage and a signal electrode applied voltage for time-divisionally driving the liquid crystal cell 30 at a predetermined duty ratio. The driving waveform forming circuit 62 then applies these voltages to each scanning electrode 33 and each signal electrode 34 of the liquid crystal cell 30, thereby driving the liquid crystal cell 30.

With this operation, a driving voltage is applied to each pixel portion of the liquid crystal cell 30 to cause a pixel corresponding to the pixel portion to have a corresponding designated color. As a result, as shown in FIGS. 3 and 4, the x- and y-axes a and b are displayed with "red" pixels; the linear curve c represented by function (1) and the quadratic curve d represented by function (2), "white" pixels; the region e satisfying two functions (1) and (2), "green" pixels; and the remaining region, i.e., the background, "blue" pixels.

The color liquid crystal display apparatus of this embodiment can change the display color to n colors by changing the RMS voltage applied to the liquid crystal 38 to n levels. A liquid crystal driving method for this operation will be described in detail next.

When a seven-color display operation is to be performed by using the color liquid crystal display apparatus shown in FIG. 1, seven different driving voltages, i.e., first to seventh driving voltages, like those described below are applied between the opposing electrodes 33 and 34 of the liquid crystal cell 30.

The first driving voltage is a driving voltage having a waveform formed such that each of applied voltages (RMS voltages) in all the frames required to form one screen serves as a voltage for coloring emerging light transmitted through the color liquid crystal display apparatus to have a first color, e.g., a display color obtained when the liquid crystal molecules of the liquid crystal cell 30 are raised/aligned almost vertically.

The second driving voltage is a driving voltage having a waveform formed such that each of applied voltages (RMS voltages) in all the frames required to form one screen serves as a voltage for coloring the emerging light to have a second color, e.g., a display color having a high light intensity and high color purity, which is obtained as the liquid crystal molecules are raised/aligned from the initial twist-aligned state.

The third driving voltage is a driving voltage having a waveform formed such that each of applied voltages (RMS voltages) in selection periods in all the frames required to form one screen serves as a voltage for coloring the emerging light to have a third color, e.g., a display color obtained when the liquid crystal molecules are in the initial twist-aligned state.

The fourth driving voltage is a driving voltage having a waveform formed such that each of applied voltages in the frames of one of two frame groups constituting the frames required to form one screen, each frame group consisting of a desired number of frames, serves as a voltage for coloring the emerging light to have the first color, and each of applied voltages in the frames of the other frame group serves as a voltage for coloring the emerging light to have the second color.

The fifth driving voltage is a driving voltage having a waveform formed such that each of applied voltages in the frames of one of two frame groups constituting the frames required to form one screen, each frame group consisting of a desired number of frames, serves as a voltage for coloring the emerging light to have the second color, and each of applied voltages in the frames of the other frame group serves as a voltage for coloring the emerging light to have the third color.

The sixth driving voltage is a driving voltage having a waveform formed such that each of applied voltages in the frames of one of two frame groups constituting the frames required to form one screen, each frame group consisting of a desired number of frames, serves as a voltage for coloring the emerging light to have the third color, and each of applied voltages in the frames of the other frame group serves as a voltage for coloring the emerging light to have the first color.

The seventh driving voltage is a driving voltage having a waveform formed such that each of applied voltages in the frames of one of three frame groups constituting the frames required to form one screen, each frame group consisting of a desired number of frames, serves as a voltage for coloring the emerging light to have the first color; each of applied voltages in the frames of another frame group serves as a voltage for coloring the emerging light to have the second color; and each of applied voltages in the frames of the remaining frame group serves as a voltage for coloring the emerging light to have the third color.

The first to seventh driving voltages are respectively applied between the electrodes 33 and 34 of the liquid crystal cell 30 to drive the liquid crystal cell 30. When the first driving voltage is applied, the display color becomes the first color. When the second driving voltage is applied, the display color becomes the second color. When the third driving voltage is applied, the display color becomes the third color.

When the fourth driving voltage is applied, the display color becomes a color obtained by mixing the first and second colors. When the fifth driving voltage is applied, the display color becomes a color obtained by mixing the second and third colors. When the sixth driving voltage is applied, the display color becomes a color obtained by mixing the third and first colors. When the seventh driving voltage is applied, the display color becomes a color obtained by mixing the first, second, and third colors.

The above color liquid crystal display apparatus, therefore, can change the display color of a given portion, i.e., a portion where one scanning or common electrode 33 opposes one signal or segment electrode 34, to a plurality of colors including mixed colors.

Figure 6:
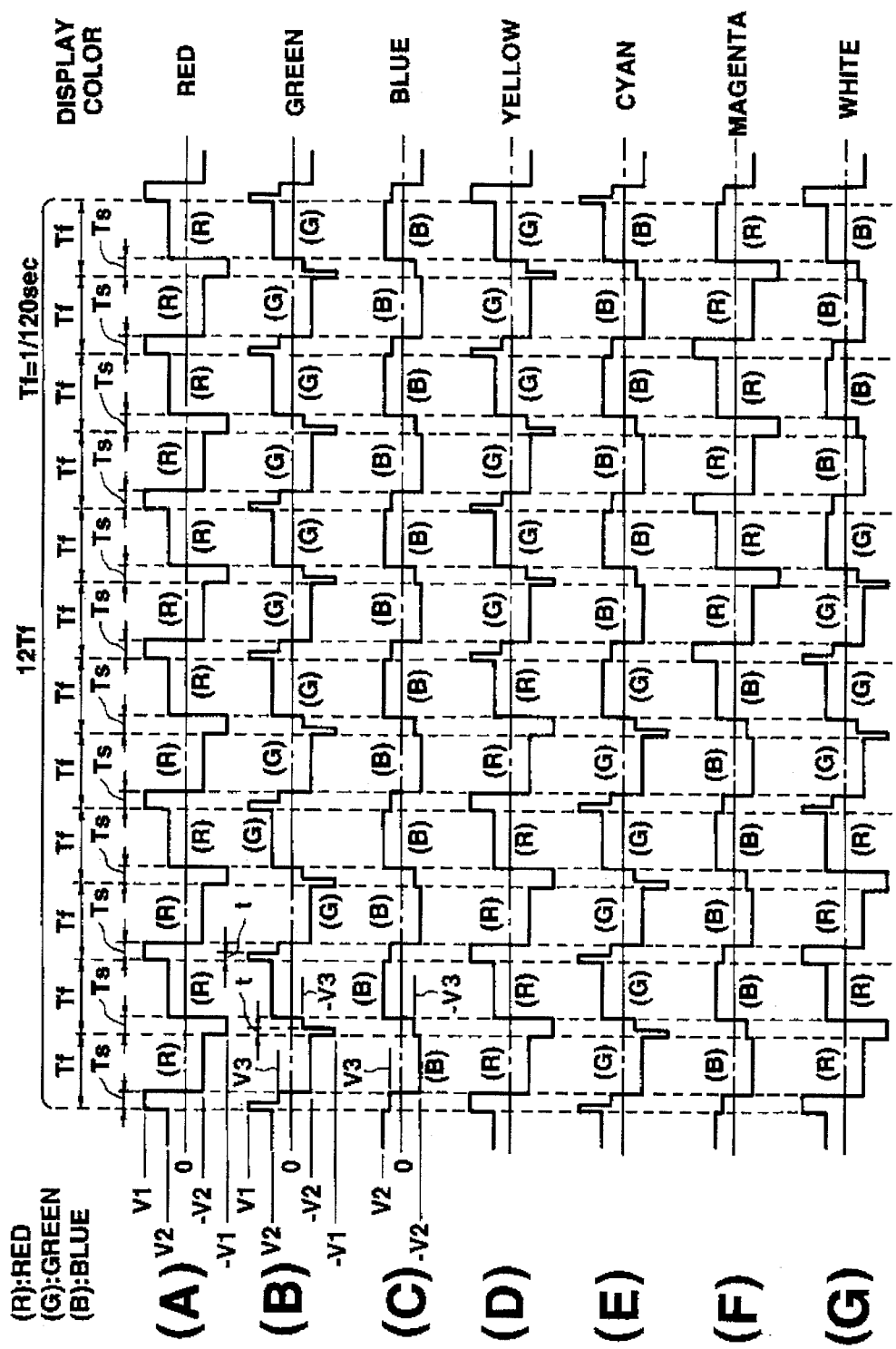
FIG. 6 is a timing chart showing driving waveforms for driving the color liquid crystal display apparatus of the first embodiment.

FIG. 6 shows the waveforms of driving voltages applied between one common electrode 33 and one segment electrode 34 in a case wherein the common electrodes 33 of the liquid crystal cell 30 are divided into three groups, and are time-divisionally driven at a duty of 3. Referring to FIG. 6, reference symbol (A) denotes the first driving voltage; (B), the second driving voltage; (C), the third driving voltage; (D), the fourth driving voltage; (E), the fifth driving voltage; (F), the sixth driving voltage; and (G), the seventh driving voltage. Note that in this case, one frame Tf is defined as Tf=1/120 sec, and one screen is constituted by 12 frames (12 Tf).

The first driving voltage (A) is a driving voltage which is set to a voltage value V1 or −V1 throughout a selection period Ts in each of the frames Tf (12 frames) required to form one screen, and is set to a voltage value V2 or −V2 during each non-selection period. In this case, a voltage waveform per frame is represented by (R).

The second driving voltage (B) is a driving voltage which is set to the voltage value V1 or −V1 only for a predetermined initial period in the selection period Ts in each of the frames Tf required to form one screen; is set to a voltage value V3 for the remaining period in each selection period Ts; and is set to the voltage value V2 or −V2 during each non-selection period. In this case, a voltage waveform per frame is represented by (G).

The third driving voltage (C) is a driving voltage which is set to the voltage value V3 or −V3 throughout the selection period Ts in each of the frames Tf (12 frames) required to form one screen, and is set to a voltage value V2 or −V2 during each non-selection period. In this case, a voltage waveform per frame is represented by (B).

Note that the polarities of each of these first to third driving voltages are inverted in units of frames.

The fourth driving voltage (D) is a driving voltage which has the same waveform as that of the first driving voltage (A) in each frame Tf of the first six frames of the frames (12 frames) required to form one screen, and has the same waveform as that of the second driving voltage (B) in each frame Tf of the second six frames.

The fifth driving voltage (E) is a driving voltage which has the same waveform as that of the second driving voltage (B) in each frame Tf of the first six frames of the frames (12 frames) required to form one screen, and has the same waveform as that of the third driving voltage (C) in each frame Tf of the second six frames.

The sixth driving voltage (F) is a driving voltage which has the same waveform as that of the third driving voltage (C) in each frame Tf of the first six frames of the frames (12 frames) required to form one screen, and has the same waveform as that of the first driving voltage (A) in each frame Tf of the second six frames.

The seventh driving voltage (G) is a driving voltage which has the same waveform as that of the first driving voltage (A) in each frame Tf of the first three frames of the frames (12 frames) required to form one screen; has the same waveform as that of the second driving voltage (B) in each frame Tf of the second three frames; and has the same waveform as that of the third driving voltage (c) in each frame Tf of the third six frames.

The voltage values V1 and V3 of the respective driving voltages (A) to (G) during each selection period Ts and the voltage value V2 thereof during each non-selection period will be described below. An RMS voltage applied between the electrodes 33 and 34 of the liquid crystal cell 30 which is time-divisionally driven is expressed by the following equation:

$$V = \sqrt{\frac{1}{N}\left[\frac{1}{Po}\left\{P + \left(1 - \frac{2}{b}\right)^2 (Po - P)\right\} + (N-1)\left(\frac{1}{b}\right)^2\right]} \; Vo \tag{3}$$

where N is the duty number, b is the bias ratio, Po is the division number of the maximum value of the RMS voltage V, P is the ordinal number of each divided voltage value, and Vo is the maximum value of a voltage (absolute value) applied during each selection period.

For example, as described above, in the color liquid crystal display apparatus, in which the angular difference φ between the transmission axis 41a of the upper polarizing plate 41 and the optical axis 40a of the retardation plate 40 is set to be 45°; the angular difference ψ−θ between the liquid crystal molecule aligning direction 31a of the liquid crystal cell 30 on the substrate 31 side adjacent to the retardation plate and the optical axis 40a of the retardation plate 40 is set to be 15°; the retardation Re of the retardation plate 40 is set to be 1240 nm; the value Δn·d of the liquid crystal cell 30 is set to be 824 nm; and the twist angle of the liquid crystal molecules is set to be 240°, i.e., the color liquid crystal display apparatus for displaying three colors "red", "green", and "blue" as basic display colors shown in Table 1, voltage values |V1| and |V3| in each selection period Ts and a voltage value |V2| in each non-selection period are given by the following equations on the basis of equation (3):

$$|V1| = Vo \tag{4}$$

$$|V2| = \frac{1}{b} Vo \tag{5}$$

$$|V3| = \left(1 - \frac{1}{b}\right) Vo \tag{6}$$

Assume that the voltage values |V1| and |V3| in each selection period Ts and the voltage value |V2| in each non-selection period are set in this manner, and the above color liquid crystal display apparatus whose basic display colors are "red", "green", and "blue" is driven. In this case, if the duty number N is set to be 3, the bias ratio is set to be 2.7, and the maximum value Vo of a voltage applied during each selection period Ts is set to be 3.2 V, the following RMS voltages V and display colors are obtained when the ordinal number P of each divided voltage value is set as P=0, P=1, and P=3.

When P=0, V=1.1 V, and the display color is "blue".
When P=1, V=1.5 V, and the display color is "green".
When P=3, V=2.1 V, and the display color is "red".

Note that in this color liquid crystal display apparatus, since a clear display color cannot be obtained with the divided voltage value defined by P=2, the divided voltage value defined by P=2 is not used for a driving operation.

In the color liquid crystal display apparatus for displaying "red", "green", and "blue" as basic display colors, as shown in FIG. 3, when the first driving voltage (A) is applied between the electrodes 33 and 34 of the liquid crystal cell 30, the display color becomes "red"; when the second driving voltage (B) is applied, the display color becomes "green"; and when the third driving voltage (C) is applied, the display color becomes "blue".

In this case, although one frame Tf is as short as 1/120 sec, since each of the above-described driving voltages is applied for the time period corresponding to 12 frames as one unit, each of the "red", "green", and "blue" displays is kept for the time period corresponding to 12 frames (12 Tf=1/10 sec). Therefore, an observer of the displays can recognize the respective color displays.

When the fourth driving voltage (D) is applied between the electrodes 33 and 34 of the liquid crystal cell 30, "red" is displayed in the first six frames of 12 frames constituting one screen, as in the case wherein the first driving voltage (A) is applied, and "green" is displayed in the second six frames, as in the case wherein the second driving voltage (B) is applied.

In this case, the "red" and "green" displays continue for the first and second six frames (6 Tf=1/20 sec), respectively. With such short duration of color display, "red" and "green" as basic colors cannot be separately recognized by the human eyes. For this reason, a color obtained by mixing all the display colors in 12 frames constituting one screen is recognized as a display color.

Such a method of mixing colors is called time difference mixture. When the color of one six-frame display is "red", and the color of the other six-frame display is "green", as in the above case, the recognized display color is "yellow".

Similar color mixture occurs when the fifth and sixth driving voltages (E) and (F) are applied. When the fifth driving voltage (E) is applied, "green" is displayed in the first six frames, and "blue" is displayed in the second six frames. As a result, "cyan" as a mixed color is recognized as a display color. When the sixth driving voltage (F) is applied, "blue" is displayed in the first six frames, and "red" is displayed in the second six frames. As a result, "magenta" as a mixed color is recognized as a display color.

When the seventh driving voltage (G) is applied, "red" is displayed in the first four frames of 12 frames constituting one screen, as in the case wherein the first driving voltage (A) is applied; "green" is displayed in the second four frames, as in the case wherein the second driving voltage (B) is applied; and "blue" is displayed in the third four frames, as in the case wherein the third driving voltage (C) is applied.

In this case, each of the "red", "green", and "blue" displays continues for the time period corresponding to four frames (4 Tf=⅓₀ sec). Since these basic colors "red", "green", and "blue" cannot be separately recognized by the human eyes, "white" which is the color obtained by mixing all these colors is recognized as a display color.

The basic colors of the display colors to be displayed by the color liquid crystal display apparatus are not limited to the above three colors, i.e., "red", "green", and "blue", and arbitrary colors can be selected as basic colors by arbitrarily setting the retardation Re of the retardation plate 40, the value Δn·d and twist angle of the liquid crystal cell 30, the angular difference φ between the transmission axis 41a of the upper polarizing plate 41 and the optical axis 40a of the retardation plate 40, and the angular difference (ψ−θ) between the liquid crystal molecule aligning direction 31a of the liquid crystal cell 30 on the substrate 31 side adjacent to the retardation plate and the optical axis 40a of the retardation plate 40.

In the above embodiment, the number of frames required to form one screen is set to be 12. However, the number of frames may be arbitrarily set in accordance with the time of one frame Tf.

In the above embodiment, the frames required to form one screen are formed into frame groups having the same number of frames, and each of the fourth to seventh driving voltages (D) to (G) is formed such that a waveform in each frame group is designed to display the first basic color ("red" in FIG. 6), the second basic color ("green" in FIG. 6), or the third basic color ("green" in FIG. 6). However, allocations of frames to the fourth to seventh driving voltages may be arbitrarily determined.

In this case, in a mixed color to be displayed, the display color component of a frame group having a larger number of frames is larger in amount than the display color components of the remaining frame group or groups. Therefore, if a plurality of voltages having different waveforms to which different numbers of frames are allocated are used as the fourth to seventh driving voltages (D) to (G), a plurality of mixed colors having different color tones, which respectively contain basic colors at different mixing ratios, can be displayed.

In allocating different numbers of frames to driving voltages in this manner, if the duration of display of the color component, of the basic colors constituting a mixed color, which is set to be larger in amount than the remaining color components exceeds ¹⁄₂₀ sec, this color can be recognized by the human eyes. As a result, "flicker" occurs in a display. If the duration of display of a color component which is set to be smaller in amount than the remaining color components is shorter than ¹⁄₁₀ sec, the aligned state of the liquid crystal molecules cannot be satisfactorily controlled owing to the response characteristics of the liquid crystal 38. For this reason, frames are preferably allocated to the fourth to seventh driving voltages (D) to (G) such that the duration of display of one basic color falls within the range of ¹⁄₁₀ sec to ¹⁄₁₅ sec.

In this embodiment, the retardation plate 40 is disposed between the liquid crystal cell 30 and the upper polarizing plate 41. However, the retardation plate 40 may be disposed between the liquid crystal cell 30 and the lower polarizing plate 42.

In addition, in the embodiment, the transmission axes 41a and 42a of the polarizing plates 41 and 42 are set to be almost parallel to each other. However, these transmission axes may be set to be almost perpendicular to each other.

SECOND EMBODIMENT

Figure 7:
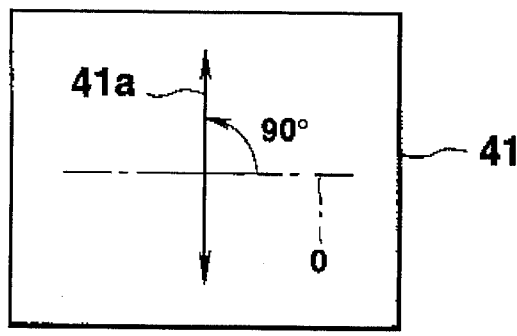
FIG. 7 is a view for explaining the optical arrangement of the respective optical elements in a color liquid crystal display apparatus according to the second embodiment of the present invention.
Figure 7:
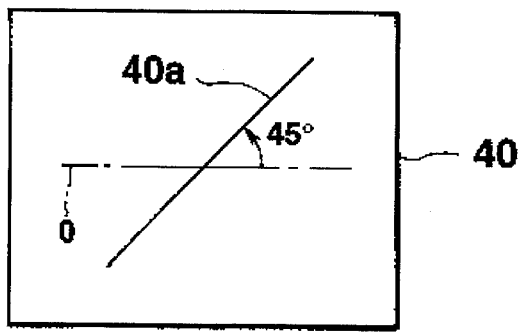
Figure 7:
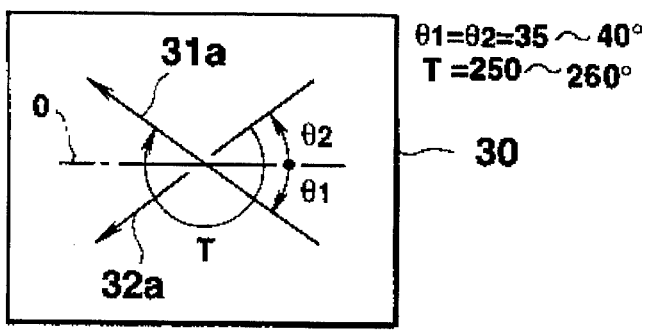
Figure 7:
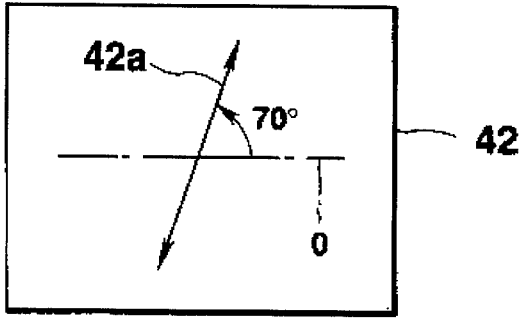

As shown in FIG. 7, in the second embodiment, the twist angle of the liquid crystal 38 of the liquid crystal cell 30 in the first embodiment is increased to 250° to 260°, and the polarizing plate 42 adjacent to the lower substrate 32 of the liquid crystal cell 30 is arranged such that the transmission axis 42a crosses the transmission axis 41a of the upper polarizing plate 41 at an angle of 20°. Other arrangements are the same as those of the first embodiment. The same reference numerals in the second and subsequent embodiments denote the same parts as in the first embodiment, and a description thereof will be omitted.

As shown in FIG. 7, a liquid crystal molecule aligning direction 31a of a liquid crystal cell 30 on the upper substrate 31 side is inclined with respect to a reference line (horizontal line in FIG. 7) O by a predetermined angle θ1 in the clockwise direction in FIG. 7. A liquid crystal molecule aligning direction 32a of the liquid crystal cell 30 on the lower substrate 32 side is inclined with respect to the reference line O by a predetermined angle θ2 in the counterclockwise direction in FIG. 7. The molecules of a liquid crystal 38 are twist-aligned from the lower substrate 32 side to the upper substrate 31 side in the clockwise direction in FIG. 7.

In this embodiment, the inclination angles θ1 and θ2 of the liquid crystal molecule aligning directions 31a and 32a of the liquid crystal cell 30 on the two substrate (31 and 32) sides with respect to the reference line O are set to be θ1=θ2. This inclination angle θ1 or θ2 is 35° to 40°. A twist angle T of the liquid crystal molecules is 250° to 260°.

Referring to FIG. 7, reference numeral 41a denotes a transmission axis of the polarizing plate 41; and 42a, a transmission axis of the lower polarizing plate 42. In this embodiment, the transmission axis 41a of the upper polarizing plate 41 is shifted from the reference line O by about 90° in the counterclockwise direction in FIG. 7, and the transmission axis 42a of the lower polarizing plate 42 is shifted from the reference line O by about 70° in the counterclockwise direction in FIG. 7.

In addition, an optical axis 40a of a retardation plate 40 is shifted from the reference line O by about 45° in the counterclockwise direction in FIG. 7. Therefore, the optical axis 40a of the retardation plate 40 is shifted from the transmission axis 41a of the polarizing plate adjacent to the retardation plate 40, i.e., the upper polarizing plate 41, by about 45° in the clockwise direction in FIG. 7.

In the above color liquid crystal display apparatus, owing to the same effects as those of the first embodiment, a bright color display can be obtained, and the display color can be arbitrarily changed by controlling the voltage applied to the liquid crystal cell 30. In addition, since the twist angle T of the liquid crystal molecules of the liquid crystal cell 30 is set to be 250° to 260°, a time-divisional driving operation can be performed at a high duty.

The display color and driving duty number of the above color liquid crystal display apparatus will be described below. The display color of the color liquid crystal display apparatus is determined by a refractive index anisotropy Δn and a liquid crystal layer thickness d of the liquid crystal cell 30, a retardation Re of the retardation plate 40, and the directions of the optical axis 40a of the retardation plate 40 and the transmission axes 41a and 42a of the pair of polarizing plates 41 and 42. The display color changes with a change in voltage applied between electrodes 33 and 34 of the liquid crystal cell 30. The maximum allowable duty number is determined by the ratio of an applied voltage value with which an initial display color (obtained when the liquid crystal molecules are in a twist-aligned state) can be obtained to an applied voltage value with which a final display color (obtained when the liquid crystal molecules are raised/aligned almost vertically) can be obtained.

Tables 5 and 6 show the display colors and allowable duty numbers of color liquid crystal display apparatuses, in each of which the refractive index anisotropy Δn and liquid crystal layer thickness d of the liquid crystal cell 30 are set as Δn=0.13 and d=6.8 μm; the retardation Re of the retardation plate 40 is set as Re=1,350 nm; and the directions of the optical axis 40a of the retardation plate 40 and the transmission axes 41a and 42a of the pair of polarizing plates 41 and 42 are set as shown in FIG. 7. Table 5 shows a case wherein the twist angle T of the liquid crystal cell 30 is set as T=250°. Table 6 shows a case wherein the twist angle T of the liquid crystal cell 30 is set as T=260°.

Note that all the numerical values in Tables 5 and 6 are approximate values, and the value of each applied voltage is an RMS. In addition, each display color is recognized when the display of the liquid crystal display apparatus is viewed in front of it.

TABLE 5

| Liquid Crystal Twist Angle T = 250° | | |
|---|---|---|
| Applied Voltage | Voltage Value | Display Color |
| V1 | 1.90 V or less | Blue |
| V2 | 2.08 to 2.10 V | Green |
| V3 | 2.22 V or more | Red |
| Allowable Duty Number | | 42 |

TABLE 6

| Liquid Crystal Twist Angle T = 260° | | |
|---|---|---|
| Applied Voltage | Voltage Value | Display Color |
| V1 | 2.04 V or less | Blue |
| V2 | 2.10 to 2.14 V | Green |

TABLE 6-continued

| Liquid Crystal Twist Angle T = 260° | | |
|---|---|---|
| Applied Voltage | Voltage Value | Display Color |
| V3 | 2.26 V or more | Red |
| Allowable Duty Number | | 96 |

As shown in Tables 5 and 6, the above color liquid crystal display apparatus has three display colors, i.e., blue, green, and red. As the voltage applied to the liquid crystal cell 30 is increased, the display color changes from "blue" as an initial display color, obtained when the applied voltage is V1, to "red" as a final display color, obtained when the applied voltage is V3. In this process of color change (when the applied voltage is V2), a display color "green" having a high light intensity and high color purity can be obtained.

An allowable duty number N of the color liquid crystal display apparatus is calculated from the applied voltage V1, with which the initial display color can be obtained, and the applied voltage V3, with which the final display color can be obtained, according to equation (7):

$$N=\{(V_3^2+V_1^2)/(V_3^2-V_1^2)\}^2 \qquad (7)$$

That is, when the twist angle T of the liquid crystal cell 30 is set as T=250°, the allowable duty number N is 42, as shown in Table 5. When the twist angle T of the liquid crystal cell 30 is set as T=260°, the allowable duty number N is 96, as shown in Table 6. In either color liquid crystal display apparatus, a time-divisional driving operation can be performed at a high duty.

When an STN type liquid crystal cell having a twist angle of about 240°, which is generally used, is used as the liquid crystal cell 30 of the above color liquid crystal display apparatus, the allowable duty number N is at best about 9. If, however, the twist angle T of the liquid crystal cell 30 is set to be 250°, the allowable duty number N is increased four times or more, i.e., increased to 42. If the twist angle T of the liquid crystal cell 30 is set to be 260°, the allowable duty number N is increased ten times or more, i.e., increased to 96.

Theoretically, if the twist angle T of the liquid crystal cell 30 is set to be larger than 260°, the liquid crystal cell 30 can be driven at a higher duty. However, if the twist angle T of the liquid crystal molecules is set to be larger than 260°, the twist-aligned state of the liquid crystal molecules becomes unstable, resulting in display irregularity and the like. For this reason, the proper range of the twist angles T of the liquid crystal molecules is from 250° to 260°.

Modifications of the second embodiment will be described next with reference to FIGS. 8 and 9.

In each modification, the directions of the optical axis 40a of the retardation plate 40 and the transmission axes 41a and 42a of the pair of polarizing plates 41 and 42 in the second embodiment are changed, but other arrangements are the same as those of the second embodiment.

Figure 8:
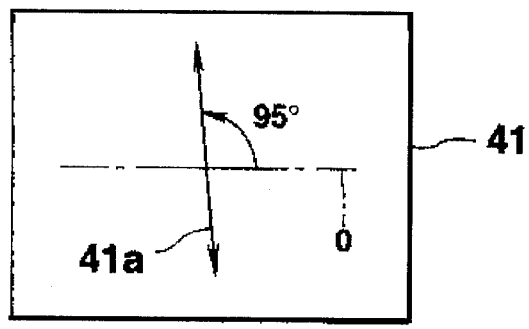
FIG. 8 is a view for explaining a modification of the optical arrangement in the second embodiment.
Figure 8:
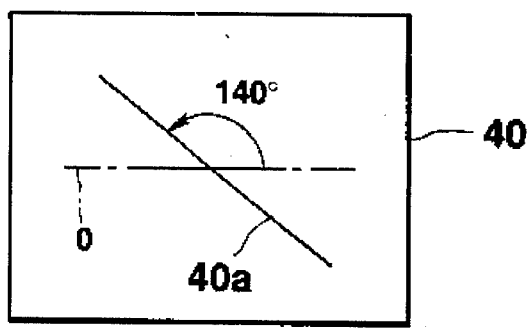
Figure 8:
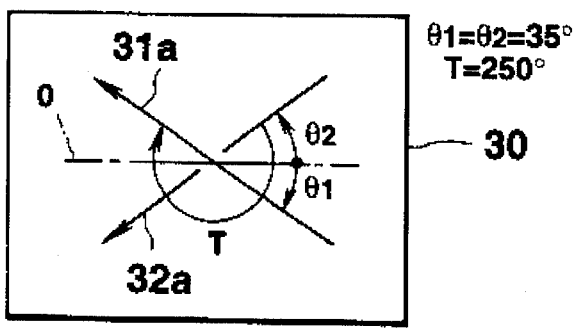
Figure 8:
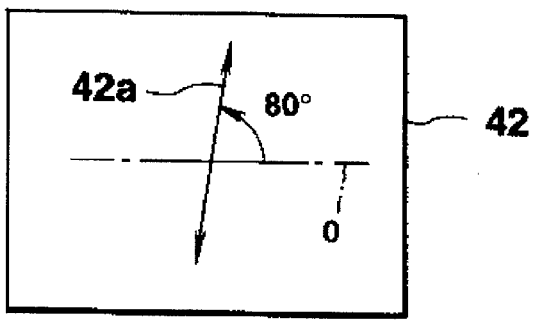

In the modification shown in FIG. 8, the transmission axis 41a of the upper polarizing plate 41 is shifted from the reference line O by about 95° in the counterclockwise direction in FIG. 8, and the transmission axis 42a of the lower polarizing plate 42 is shifted from the reference line O by about 80° in the counterclockwise direction in FIG. 8. In addition, the optical axis 40a of the retardation plate 40 is shifted from the reference line O by about 140° in the counterclockwise direction in FIG. 8. The optical axis 40a of the retardation plate 40 is shifted from the transmission axis 41a of the upper polarizing plate 41 adjacent to the retardation plate 40 by about 45° in the counterclockwise direction in FIG. 8.

The display colors and driving duty number of the color liquid crystal display apparatus of this modification will be described below. Table 7 shows the display colors and allowable duty number of the color liquid crystal display apparatus in which the refractive index anisotropy Δn and the liquid crystal layer thickness d of the liquid crystal 38 of the liquid crystal cell 30 are set as Δn=0.13 and d=6.8 μm, respectively; the retardation Re of the retardation plate 40 is set as R3=1,350 nm; and the directions of the optical axis 40a of the retardation plate 40 and the transmission axes 41a and 42a of the pair of polarizing plates 41 and 42 are set as shown in FIG. 8. In this case, the twist angle T of the liquid crystal cell 30 is set as T=250°. Note that all the numerical values in Table 7 are approximate values, and the value of each applied voltage is an RMS. In addition, each display color is recognized when the display of the liquid crystal display apparatus is viewed in front of it.

TABLE 7

| Liquid Crystal Twist Angle T = 250° | | |
| --- | --- | --- |
| Applied Voltage | Voltage Value | Display Color |
| V1 | 1.98 V or less | Red |
| V2 | 2.10 to 2.18 V | Green |
| V3 | 2.30 V or more | Blue |
| Allowable Duty Number | | 45 |

Figure 9:
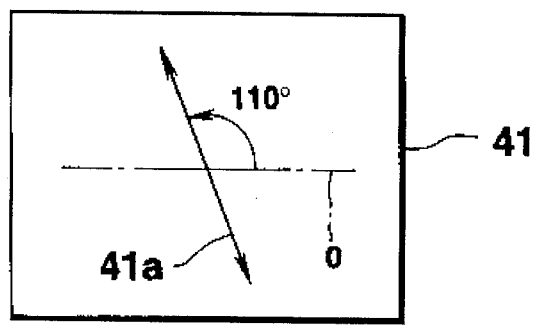
FIG. 9 is a view for explaining another modification of the optical arrangement in the second embodiment.
Figure 9:
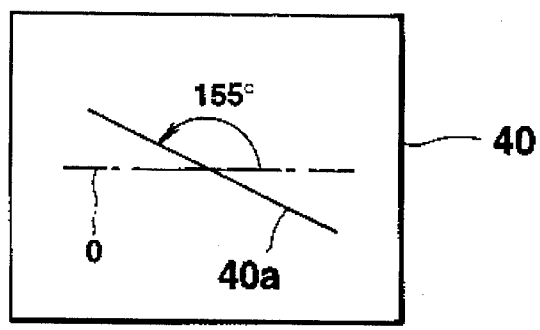
Figure 9:
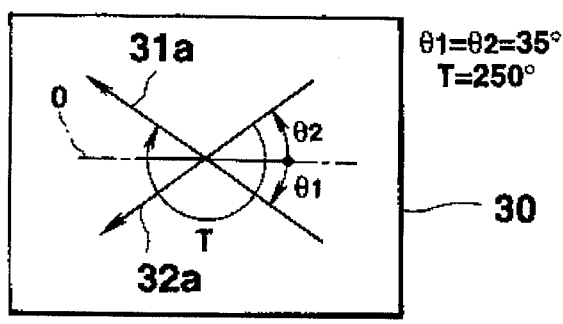
Figure 9:
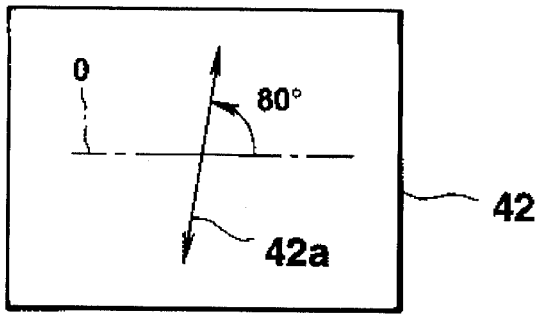

In the modification shown in FIG. 9, the transmission axis 41a of the upper polarizing plate 41 is shifted from the reference line O by about 110° in the counterclockwise direction in FIG. 9, and the transmission axis 42a of the lower polarizing plate 42 is shifted from the reference line O by about 80° in the counterclockwise direction in FIG. 9. In addition, the optical axis 40a of the retardation plate 40 is shifted from the reference line O by about 155° in the counterclockwise direction in FIG. 9. The optical axis 40a of the retardation plate 40 is shifted from the transmission axis 41a of the upper polarizing plate 41 adjacent to the retardation plate 40 by about 45° in the counterclockwise direction in FIG. 9.

The display colors and driving duty number of the color liquid crystal display apparatus of this modification will be described below. Table 8 shows the display colors and allowable duty number of the color liquid crystal display apparatus in which the refractive index anisotropy Δn and the liquid crystal layer thickness d of the liquid crystal 38 of the liquid crystal cell 30 are set as Δn=0.13 and d=6.8 μm, respectively; the retardation Re of the retardation plate 40 is set as R3=1,350 nm; and the directions of the optical axis 40a of the retardation plate 40 and the transmission axes 41a and 42a of the pair of polarizing plates 41 and 42 are set as shown in FIG. 9. In this case, the twist angle T of the liquid crystal cell 30 is set as T=250°.

TABLE 8

| Liquid Crystal Twist Angle T = 250° | | |
| --- | --- | --- |
| Applied Voltage | Voltage Value | Display Color |
| V1 | 1.94 V or less | White |
| V2 | 2.00 to 2.06 V | Green |
| V3 | 2.16 V or more | Blue |
| Allowable Duty Number | | 87 |

Methods of time-divisionally driving the color liquid crystal display apparatus of a simple matrix type shown in Table 7 by pulse modulation methods will be described next, respectively, with reference to two cases wherein a pulse width modulation scheme and a pulse height modulation scheme are used.

Figure 10A:
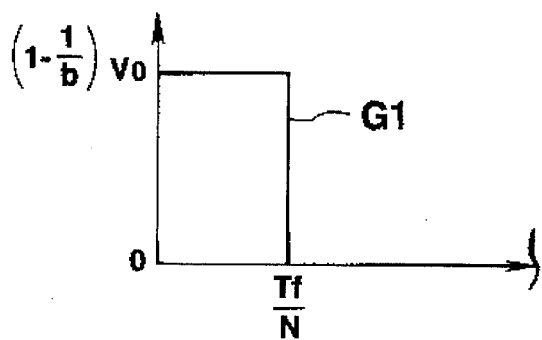
FIGS. 10A, 10B, and 10C are charts, each showing the waveform of a scanning voltage for driving the color liquid crystal display apparatus of the second embodiment.
Figure 10B:
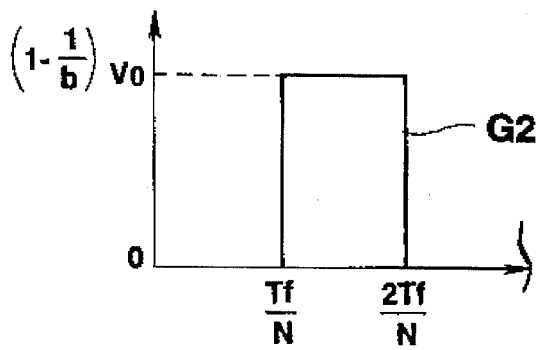
Figure 10C:
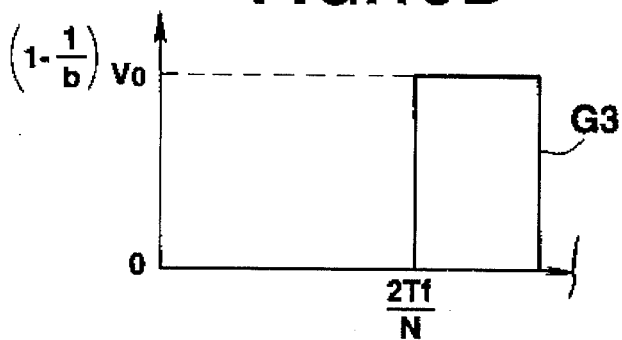
Figure 10D:
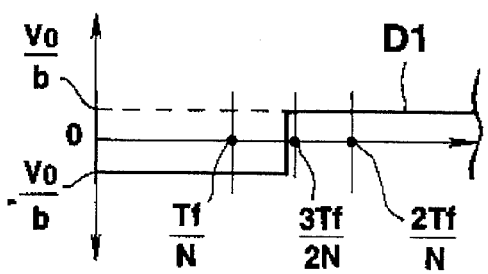
FIG. 10D is a chart showing the waveform of a signal voltage applied in correspondence with each scanning voltage.
Figure 10E:
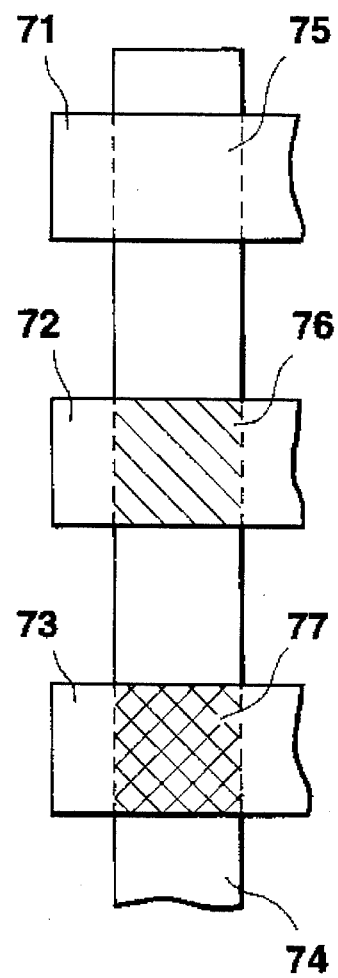
FIG. 10E is a chart for explaining an electrode arrangement in the second embodiment.

FIGS. 10A, 10B, and 10C show the waveforms of pulse voltages respectively applied to scanning electrodes 71, 72, and 73 shown in FIG. 10E. FIG. 10D shows the waveform of a pulse voltage applied to a signal electrode 74.

Let Tf be one frame time by a time-divisional driving, and N be the number of scanning lines. In this case, scanning electrodes are sequentially selected every time Tf/N, and a display signal is synchronously supplied to each signal electrode, thereby performing a color display operation.

Letting b be the bias ratio, and Vo be the operation voltage, a selection voltage applied to each scanning electrode is represented by $[1-(1/b)]Vo$.

When OFF display of each pixel is to be performed, a voltage $(1/b)Vo$ is applied to each signal electrode throughout the selection period of each scanning electrode. When ON display of each pixel is to be performed, a voltage $-(1/b)Vo$ is applied in the same manner. In this case, the pulse width modulation scheme is used in changing the RMS voltage value applied to each pixel to perform a color display operation with three or more colors. Note that OFF display of a pixel is a display obtained when the liquid crystal molecules of the pixel are aligned in one of two extreme states between which the aligned state of the liquid crystal molecules is changed. When the liquid crystal molecules are aligned in the other extreme state, ON display is obtained.

The selection time Tf/N is divided by a number obtained by subtracting one from a display color count M. When, for example, a k (k=1, 2, ..., M−1)-color display is to be performed, the voltage $-(1/b)Vo$ is applied for a period of time represented by $(Tf/N) \cdot k/(M-1)$, and the voltage $(1/b)Vo$ is applied for a period of time represented by $(Tf/N) \cdot (M-k-1)/(M-1)$. When the above liquid crystal driving voltages are applied, an RMS voltage (to be represented by $*V_k$ hereinafter) applied to a pixel for displaying the kth color is expressed by equation (8):

$$*V_k = \sqrt{\frac{1}{N}\left[\frac{1}{M-1}\left\{k+\left(1-\frac{2}{b}\right)^2 (M-k-1)\right\}+\left(\frac{1}{b}\right)^2 (N-1)\right]} \times Vo \quad (8)$$

where N is the duty number, b is the bias ratio, and Vo is the operation voltage. Assume that Vo=10.7, N=36, b=7, and M=8. In this case, when k=0, the RMS *$V_k$ is 1.97 V, and "red" is displayed on a display panel 11. When k=3, the RMS voltage *$V_k$ is 2.13 V, and "green" is displayed on the display panel 11. When k=7, the RMS voltage *$V_k$ is 2.33 V, and "blue" is displayed on the display panel 11.

Figure 11A:
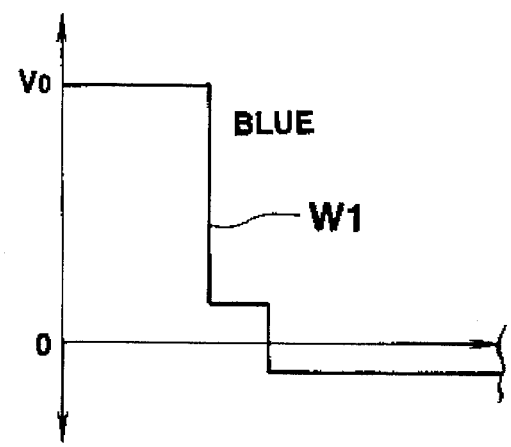
FIGS. 11A, 11B, and 11C are charts showing the waveforms of three types of voltages applied to each electrode in accordance with the voltages shown in FIGS. 10A to 10D.
Figure 11B:
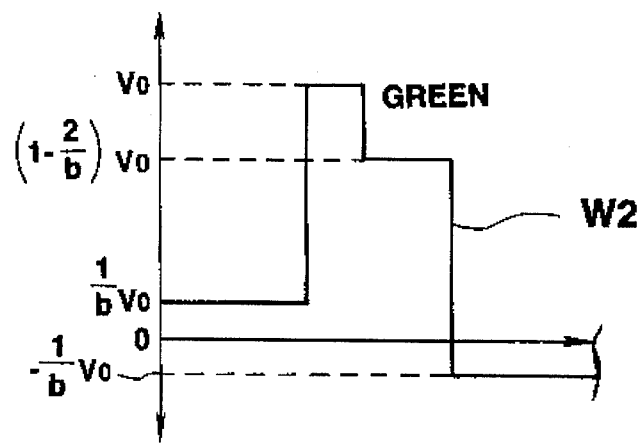
Figure 11C:
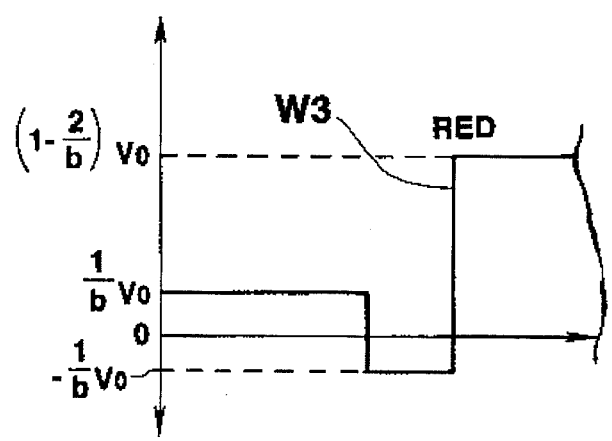

As described above, in this embodiment, pulse width modulation of a liquid crystal driving pulse is performed according to three levels, i.e., k=7, 3, 0. With this operation, as shown in FIGS. 11A, 11B, and 11C, waveforms W1 (blue display), W2 (green display), and W3 (red display) can be obtained, and the RMS voltage for driving the liquid crystal changes to three levels of desired magnitudes, thereby performing a desired color display operation.

FIGS. 12A to 12D show the waveforms of driving voltages respectively applied to scanning electrodes 71 to 73 and a signal electrode 74 in the pulse height modulation scheme. FIGS. 13A to 13C show the waveforms of composite driving voltages applied to each of pixels 75 to 77 shown in FIG. 12E.

Figure 12A:
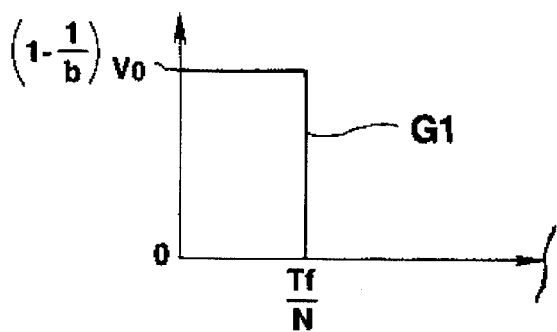
FIGS. 12A, 12B, and 12C are charts for explaining the waveforms of other three types of scanning voltages for driving the color liquid crystal display apparatus of the second embodiment.
Figure 12B:
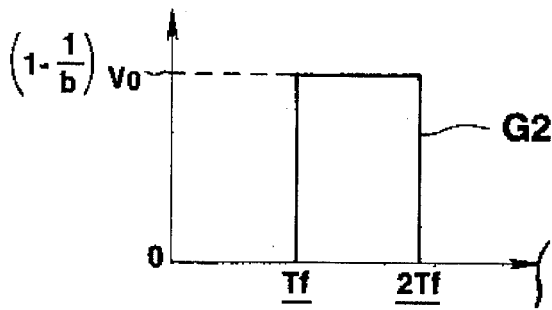
Figure 12C:
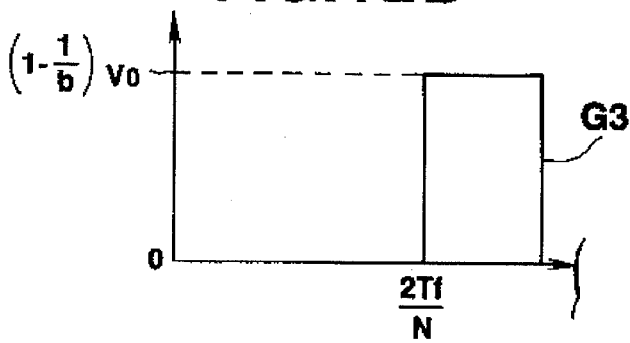
Figure 12D:
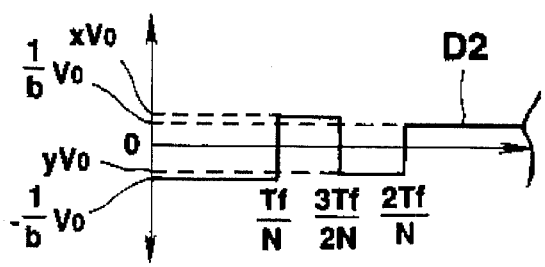
FIG. 12D is a chart showing the waveform of a signal voltage applied in correspondence with each scanning voltage.
Figure 12E:
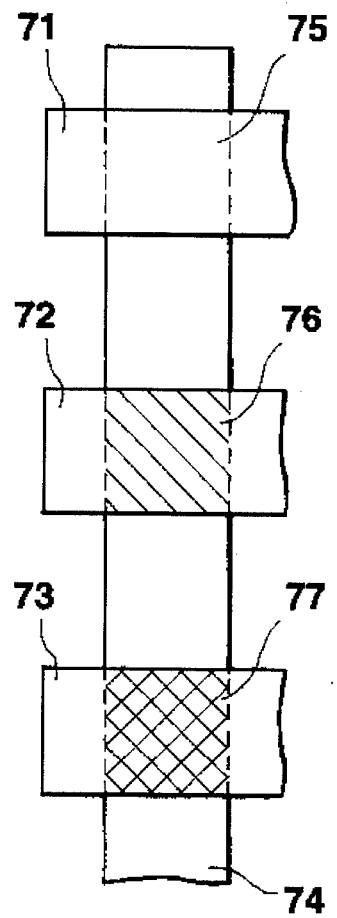
FIG. 12E is a view for explaining an electrode arrangement in the second embodiment.
Figure 13A:
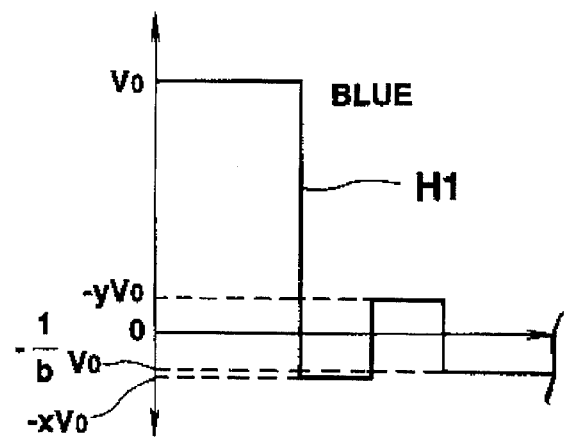
FIGS. 13A, 13B, and 13C are charts showing the waveforms of three types of voltages applied to each electrode in correspondence with the voltages shown in FIGS. 12A to 12D.
Figure 13B:
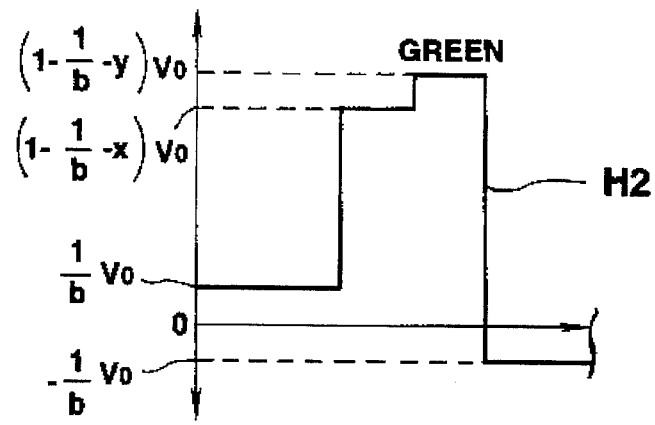
Figure 13C:
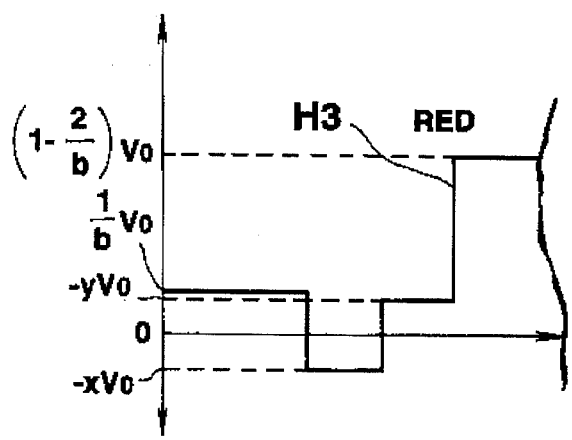

As shown in FIGS. 12A to 12C, letting Tf be the frame time, and N be the number of scanning lines, scanning electrodes are sequentially selected every time Tf/N, and a display signal is synchronously supplied to each signal electrode, thereby performing a color display operation.

Letting b be the bias ratio, and Vo be the operation voltage, a voltage applied to each of the scanning electrodes shown in FIGS. 12A to 12C is represented by [1−(1/b)]Vo.

A voltage xVo is applied to each signal electrode for a time (Tf/2N), which is half of a one-line scanning time, within a selection period of a predetermined scanning electrode, and a voltage yVo is applied for the remaining half time (Tf/2N).

In this case, pulse height modulation is performed in changing the RMS voltage value applied to each pixel to perform a color display operation.

Voltages x and y applied to a pixel portion for displaying the kth (k=0, 1, 2, . . . , M−1) color are represented by equations (9) and (10):

$$x = \frac{1}{(M-1)b}\{M-2k-1+2\sqrt{k(M-k-1)}\} \quad (9)$$

$$y = \frac{1}{(M-1)b}\{M-2k-1-2\sqrt{k(M-k-1)}\} \quad (10)$$

As a result, the RMS voltage *$V_k$ applied to a pixel for displaying the kth color is expressed by equation (11), which is identical to equation (8).

$$*V_k = \sqrt{\frac{1}{N}\left[\frac{1}{M-1}\left\{k+\left(1-\frac{2}{b}\right)^2 (M-k-1)\right\}+\left(\frac{1}{b}\right)^2 (N-1)\right]} \times Vo \quad (11)$$

where N is the duty number, b is the bias ratio, and Vo is the operation voltage. Assume that Vo=10.7, N=36, b=7, and M=8. In this case, when k=0, the RMS *$V_k$ is 1.97 V, and "red" is displayed on the display panel 11. When k=3, the RMS voltage *$V_k$ is 2.13 V, and "green" is displayed on the display panel 11. When k=7, the RMS voltage *$V_k$ is 2.33 V, and "blue" is displayed on the display panel 11.

As described above, in this embodiment, pulse height modulation of a liquid crystal driving pulse is performed according to three levels, i.e., k=7, 3, 0. With this operation, as shown in FIGS. 13A, 13B, and 13C, waveforms H1 (blue display), H2 (green display), and H3 (red display) can be obtained, and the RMS voltage for driving the liquid crystal changes to three levels of desired magnitudes, thereby performing a color display operation with three colors, i.e., blue, green, and red.

As described above, according to the color liquid crystal display apparatus of this embodiment, by modulating the pulse width or pulse height of a liquid crystal driving signal, the RMS voltage applied to each pixel can be accurately controlled to a desired value. With this operation, the color liquid crystal display apparatus of the embodiment can perform a bright color display without using any color filters.

As another pulse modulation driving method, a driving method based on a so-called active address method may be used. In this method, a plurality of scanning electrodes are simultaneously and selectively scanned by using pulse voltages having orthogonal functions, instead of performing line sequential scanning of scanning electrodes.

In the above embodiment, the description is made with reference to the case wherein the number of display colors is three. As is apparent, however, the number of display colors may be two or four or more. When the number of display colors is to be increased, the number of bits of display data is increased to change the pulse width or pulse height of each driving signal more finely, thereby finely adjusting the RMS voltage applied to each pixel.. With this operation, a multiple color display can be performed.

THIRD EMBODIMENT

A color liquid crystal display apparatus of this embodiment is the same as that of the second embodiment except that a dot display pattern is used as a display pattern, and a so-called active matrix driving scheme is used as a liquid crystal driving scheme. In the active matrix driving scheme, a thin-film transistor as a nonlinear active element is arranged for each dot.

Figure 14:
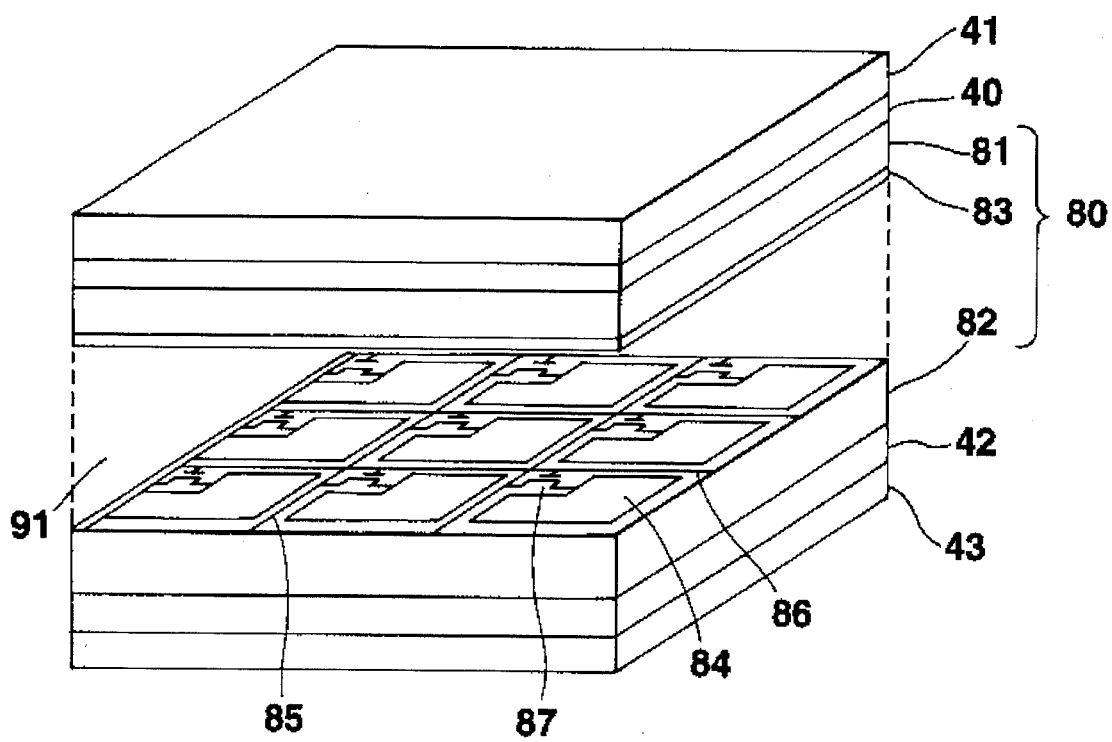
FIG. 14 is an exploded perspective view showing a color liquid crystal display apparatus according to the third embodiment of the present invention.

As shown in the perspective view of FIG. 14, upper and lower glass substrates 81 and 82 are disposed to oppose each other through a narrow space (several μm) in which a liquid crystal layer is sealed. A common electrode 83 consisting of a transparent conductive material, e.g., ITO, and a plurality of pixel electrodes 84 are respectively arranged on the opposing surfaces of the glass substrates 81 and 82.

The pixel electrodes 84 are arranged on the upper surface of the lower glass substrate 82 in the form of a matrix. Signal lines 85 and scanning lines 86 are arranged between the respective pixel electrodes 84 in the vertical and horizontal directions, respectively, one by one. That is, a plurality of signal lines 85, extending parallel to each other, and a plurality of scanning lines 86, extending parallel to each other, are arranged in the form of a matrix to cross each other at a right angle. A thin-film transistor (to be referred to as a TFT hereinafter) 87 as an active element is arranged for each pixel electrode 84. The gate, drain, and source electrodes of each TFT 87 are respectively connected to a corresponding scanning line 86, a corresponding signal line 85, and a corresponding pixel electrode 84.

Figure 15:
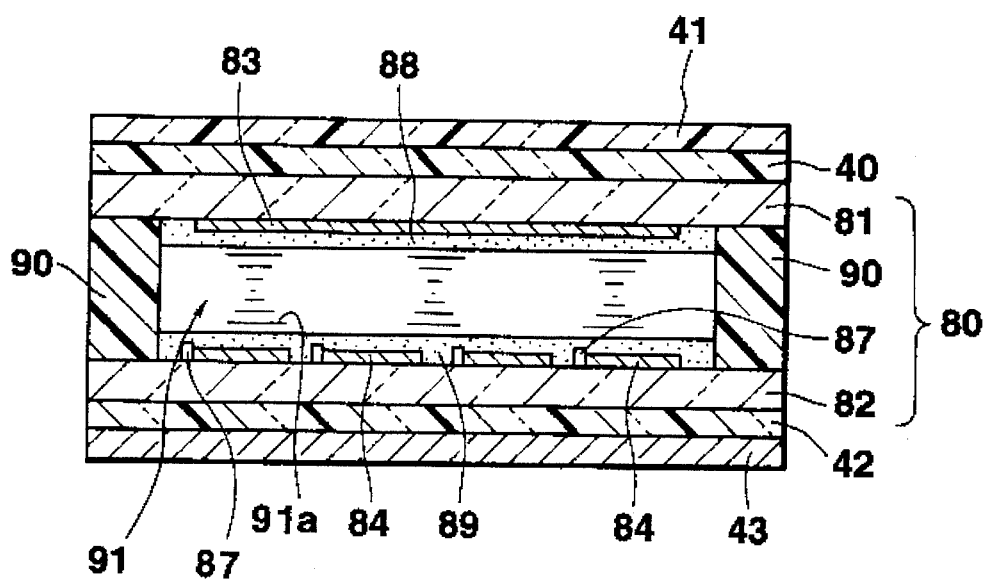
FIG. 15 is a sectional view showing the color liquid crystal display apparatus of the third embodiment.

As shown in the sectional view of FIG. 15, aligning films 88 and 89 are respectively formed on the surfaces of the common electrode 83 and each pixel electrode 84 respectively arranged on the opposing surfaces of the glass substrates 81 and 82 of a liquid crystal cell 80 so as to regulate the aligning direction of liquid crystal molecules. With this arrangement, liquid crystal molecules 91a of a liquid crystal layer are arranged to be twisted from on transparent substrate 81 to the other transparent substrate 82 at an angle of 180° to 270°.

The liquid crystal cell 80 is formed as follows. The upper and lower glass substrates 81 and 82 are disposed to oppose each other through a predetermined space, and the periphery of the space is sealed by a seal member 90. A liquid crystal 91 is injected into the space through a liquid crystal injection port (not shown).

Figure 16:
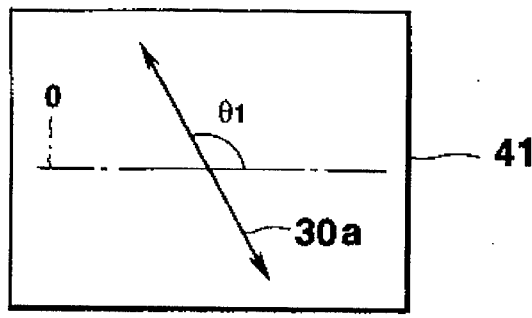
FIG. 16 is a view for explaining the optical arrangement of the respective optical elements in the third embodiment.
Figure 16:
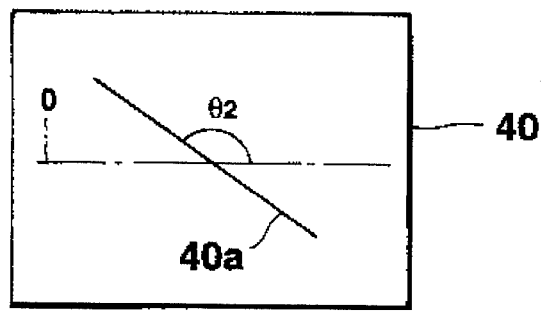
Figure 16:
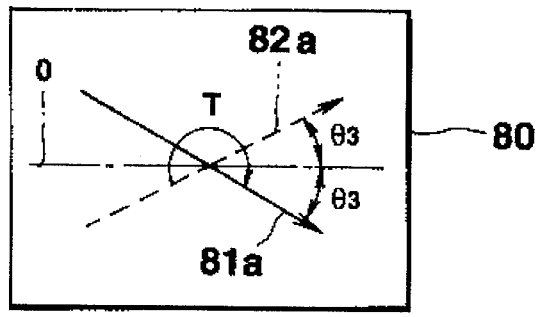
Figure 16:
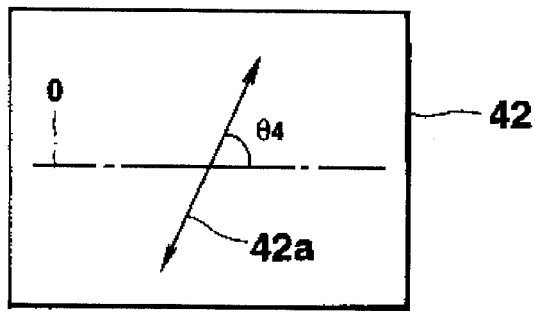

A retardation plate 40, a pair of polarizing plates 41 and 42, and a reflection plate 43, each identical to the corresponding component in the second embodiment, are attached to the liquid crystal cell 80 at the same positions as those in the second embodiment. In addition, the positions/ arrangement of the transmission axes of these polarizing plates 41 and 42, the optical axis of the retardation plate 40, and the aligning treatment directions of the aligning films 88 and 89 are set, as shown in FIG. 16. According to a preferred example of the positions/arrangement, θ1=about 95°, θ2=about 140°, θ3=about 35°, T=about 250°, θ4=about 80°, the retardation of the retardation plate 40 is about 430 nm, and a value Δn·d of the liquid crystal cell 80 is about 840 nm. In this case, when the RMS driving voltage applied to the liquid crystal cell 80 is 1.95 V, 2.15 V, and 2.33 v, red, green, and blue displays can be obtained, respectively.

Similar to the second embodiment, the color liquid crystal display apparatus of this embodiment can also obtain colored light based on the polarizing effect of the retardation plate 40, and colored light based on the polarizing effects of both the retardation plate 40 and the liquid crystal cell 80. In addition, since the polarizing effect of the liquid crystal cell 80 changes in accordance with the voltage applied to the liquid crystal cell 80, the color of light can be arbitrarily changed.

The coloring effect based on the active matrix driving scheme in the above-described color liquid crystal display apparatus will be described below.

Figure 17A:
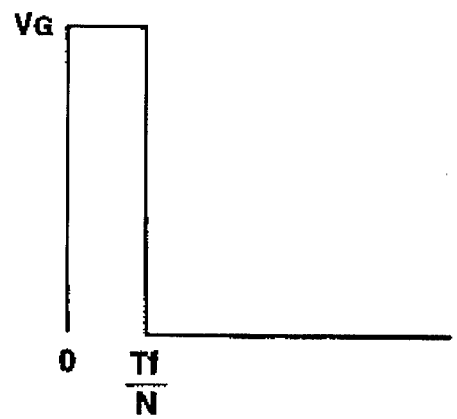
FIGS. 17A, 17B, and 17C are charts for explaining the waveforms of scanning voltages for driving the color liquid crystal display apparatus of the third embodiment.
Figure 17B:
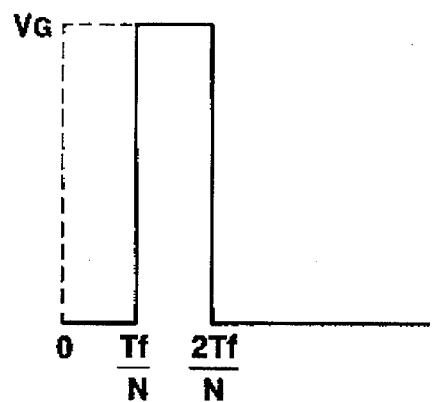
Figure 17C:
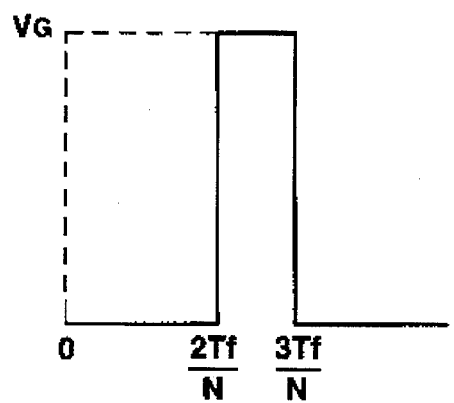
Figure 18:
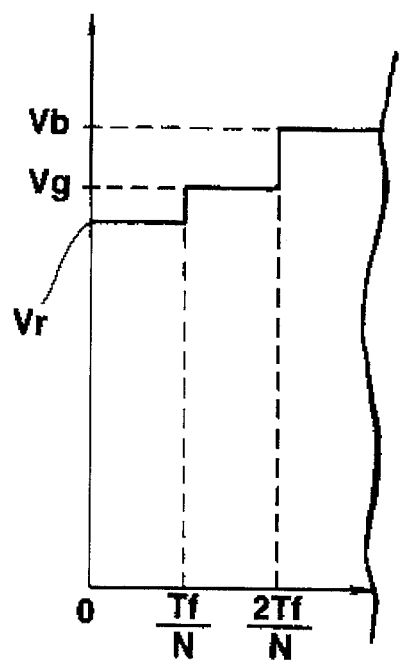
FIG. 18 is a chart showing a signal voltage applied in correspondence with the scanning voltages in FIGS. 17A to 17C.

FIGS. 17A to 17C respectively show the waveforms of voltages applied to three adjacent scanning lines 86 in a three-color display operation. FIG. 18 shows the waveform of a voltage applied to the signal line 85.

FIGS. 17A to 17C respectively show the waveforms of driving voltage signals which are sequentially applied to three adjacent scanning lines of the scanning lines 86. Line sequential scanning is performed in the order of FIGS. 17A, 17B, and 17C.

Let N be the number of scanning lines arranged on the substrate 82 in one direction, e.g., the horizontal direction, and Tf be the frame time required to line-sequentially scan N scanning lines. In this case, as shown in FIG. 17A, a scanning voltage $V_G$ is applied to the first scanning line for a time Tf/N obtained by dividing the frame time by the number of scanning lines. As a result, the TFT 87 to which the scanning voltage is applied is turned on.

FIG. 18 shows the waveform of a driving voltage signal applied to the signal line 85.

When one of signal voltages Vr (for red: 1.95 V), Vg (for green: 2.15 V), and Vb (for blue: 2.33 V) corresponding colors to be displayed and shown in FIG. 18 is applied in accordance with the timing shown in FIG. 17A at which the scanning voltage $v_G$ is applied to the first scanning line, the signal voltage corresponding to the desired display color is applied to each pixel electrode through each TFT 87 in an ON state. When a selection time for one line elapses, the corresponding TFTs 87 are turned off, and the signal voltage applied to each TFT 87 is held. That is, one capacitor is constituted by a structure in which a liquid crystal layer is sandwiched between a pixel electrode and a counter electrode so that even if a TFT is turned off after a predetermined charge is stored upon application of a signal voltage, the voltage is held. The time during which the voltage is held corresponds to one frame time Tf.

With this arrangement, since almost the same RMS voltage as the signal voltage applied to a given signal line is applied to liquid crystal molecules 91a in each of the corresponding pixels, a color display can be accurately performed.

Figure 19A:
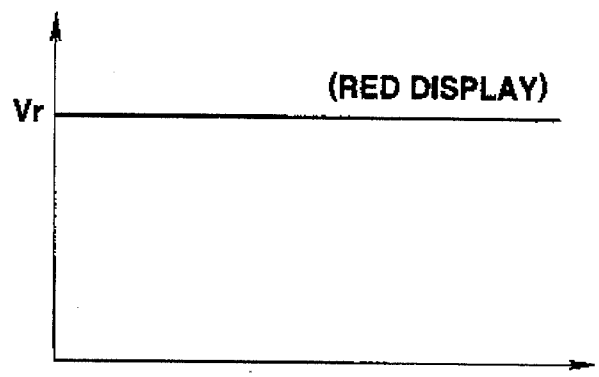
FIGS. 19A, 19B, and 19C are charts for explaining the waveforms of three types of voltages applied to each pixel in accordance with the voltages shown in FIGS. 17A to 17C and 18.
Figure 19B:
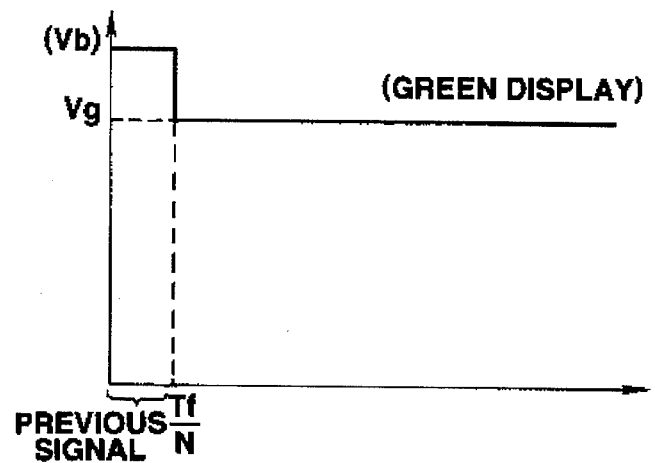
Figure 19C:
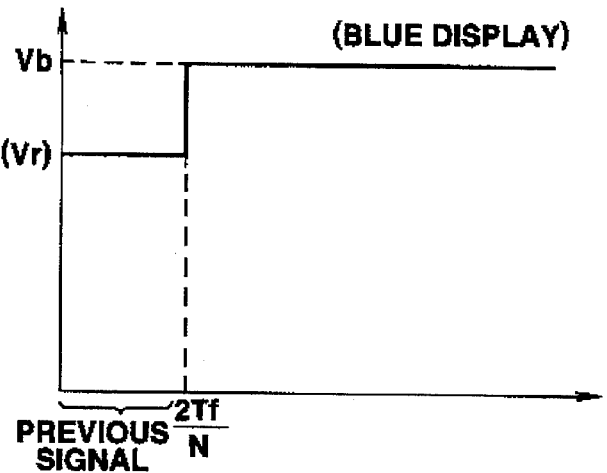

FIGS. 19A to 19C respectively show liquid crystal driving voltage waveforms indicating a state wherein a predetermined charge is held in the pixel electrode 84 and a predetermined voltage is applied to the liquid crystal.

FIG. 19A shows a driving voltage waveform for a red display. As shown in FIG. 17A, the TFTs 87 of the pixel electrodes 84 of the first line are kept on for a time interval between 0 to Tf/N by applying the scanning voltage $V_G$ to the corresponding scanning line 86. At this time, the signal voltage Vr shown in FIG. 18 is applied to a predetermined signal line 85. As a result, as shown in FIG. 19A, the voltage Vr can be stably applied to the corresponding pixel electrode 84 of the first line. With this operation, the aligned state of the liquid crystal molecules 91a of the corresponding pixel is changed to display "red".

When the second line is to be selected, as shown in FIG. 17B, the TFTs 87 of the corresponding pixel electrodes 84 are kept on for a time interval between Tf/N to 2Tf/N by applying the scanning voltage $V_G$ to the corresponding scanning line 86. At this time, for example, the signal voltage Vg shown in FIG. 18 is applied to a predetermined signal line 85. As a result, as shown in FIG. 17B, the signal voltage Vg can be stably applied to the corresponding pixel electrode 84 after Tf/N. With this operation, the aligned state of the liquid crystal molecules 101a of the corresponding pixel is changed to display "green" in place of "blue" displayed upon application of the signal voltage Vb in the previous scanning operation.

When the third line is to be selected, as shown in FIG. 17C, the TFTs 87 of the corresponding pixel electrodes 84 are kept on for a time interval between 2Tf/N to 3Tf/N by applying the scanning voltage $v_G$ to the corresponding scanning line 86. At this time, for example, the signal voltage Vb shown in FIG. 18 is applied to a predetermined signal line 85. As a result, as shown in FIG. 19C, the signal voltage Vb can be stably applied to the corresponding pixel electrode 84 after 2Tf/N. With this operation, the aligned state of the liquid crystal molecules 91a of the corresponding pixel is changed to display "blue".

As described above, according to the color liquid crystal display apparatus of this embodiment, an accurate color display operation can be easily performed by statically controlling the driving voltage applied to the liquid crystal cell 80 without using any color filters. In this case, since no color filters are used, the loss of the amount of transmitted light is greatly reduced, and the brightness of a color display can be sufficiently increased.

In the above embodiment, the description is made with reference to the case wherein the number of display colors is three. As is apparent, however, color display using two or four or more display colors may be easily achieved.

FOURTH EMBODIMENT

Figure 20:
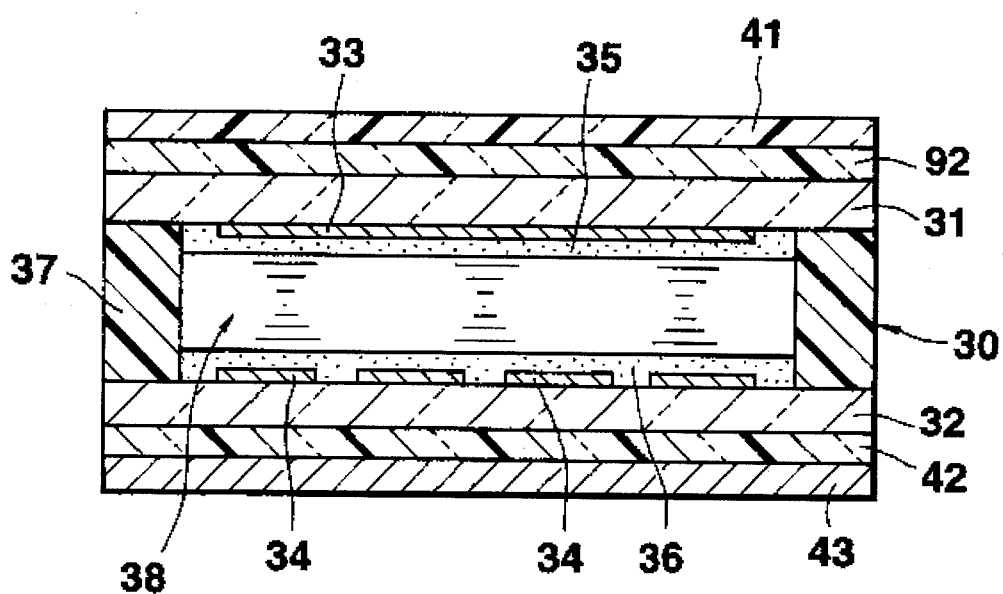
FIG. 20 is a sectional view showing a color liquid crystal display apparatus according to the fourth embodiment of the present invention.
Figure 21:
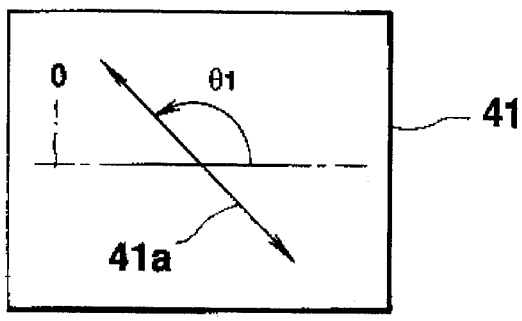
FIG. 21 is a chart for explaining the optical arrangement of the respective optical elements in the fourth embodiment.
Figure 21:
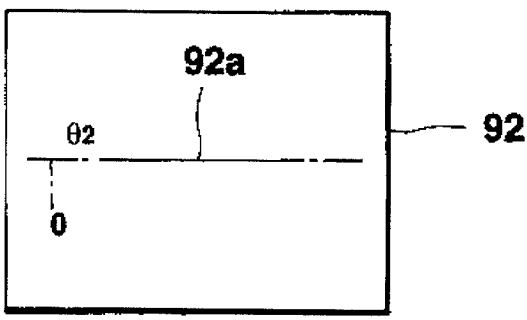
Figure 21:
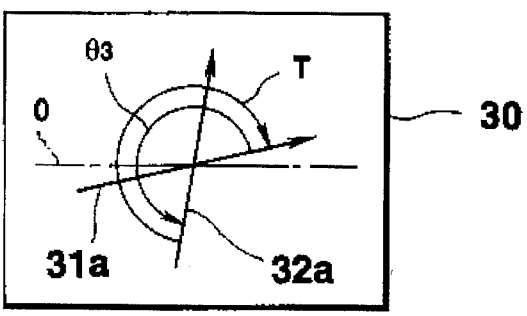
Figure 21:
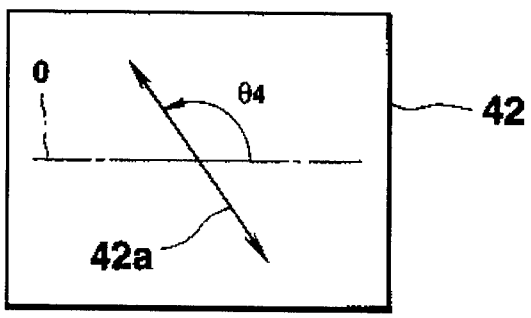
Figure 22:
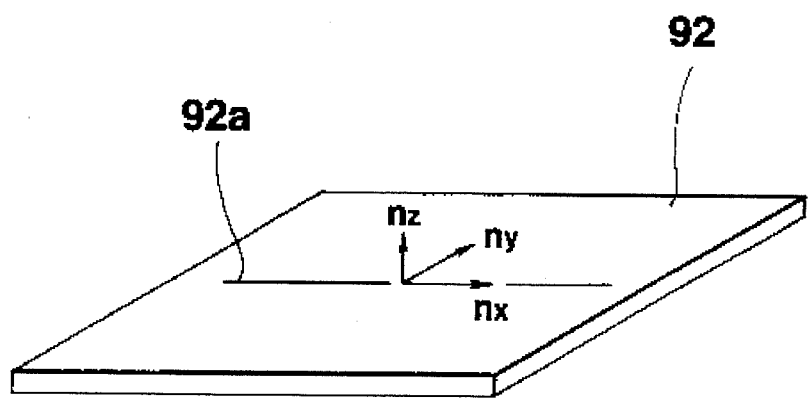
FIG. 22 is a perspective view for explaining the optical axis of a retardation plate used in the fourth embodiment.

As shown in FIGS. 20 and 21, the arrangement of a color liquid crystal display apparatus of the fourth embodiment is the same as that of the color liquid crystal display apparatus of the second embodiment except for the type of a retardation plate. More specifically, as shown in FIG. 22, provided that a direction 92a in which the refractive index is the maximum is defined as an X-axis direction, a retardation plate 92 used in this embodiment is a retardation plate which satisfies condition $n_x > n_z > n_y$ where $n_x$ is the refractive index in the X-axis direction, $n_y$ is the refractive index in the Y-axis direction perpendicular to the X-axis direction within a plane parallel to the surface of the retardation plate 92, and $n_z$ is the refractive index in the Z-axis direction which is the direction of thickness.

Similar to the color liquid crystal display apparatus of the second embodiment, the color liquid crystal display apparatus of the fourth embodiment can obtain colored light based on the polarizing effect of the retardation plate 92 and colored light based on the polarizing effects of the retardation plate 92 and a liquid crystal cell 30. In addition, since the polarizing effect of the liquid crystal cell 30 changes in accordance with the voltage applied to the liquid crystal cell 30, the color of light can be arbitrarily changed.

For example, the following display colors can be obtained by this color liquid crystal display apparatus. Assume that refractive indexes $n_x$, $n_y$, and $n_z$ of the retardation plate 92 in the x-axis, y-axis, and z-axis directions and a plate thickness (the thickness of a portion having a refractive index anisotropy) d are:

$n_x = 1.4$ $n_y = 1.2$ $n_z = 1.3$ $d = 2.15\ \mu m$ an angle θ3 of a liquid crystal molecule aligning direction 32a of the liquid crystal cell 30 on the lower substrate 32 side with respect to a reference line O, a liquid crystal molecule twist angle T, and a birefringent index Δn and liquid crystal layer thickness d' of a liquid crystal 38 are:

θ3=260°

T=250°

Δn=0.13 d'=6.8 μm and, an angle i1 of a transmission axis 41a of an upper polarizing plate 41, an angle θ2 of an optical axis 92a of a retardation plate 92, and an angle θ4 of a transmission axis 42a of a lower polarizing plate 42, with respect to the reference line O, are:

θ1=135°

θ2=0° (parallel to the reference line O)

θ4=125°

In this case, the voltage applied to the liquid crystal cell 30 and the display color have the following relationship. Note that the value of each applied voltage is an RMS, and each display color is recognized when the display of the liquid crystal display apparatus is viewed in front of it.

| (Applied Voltage) | (Display Color) |
|---|---|
| 2.04 V or less | Red |
| 2.18 to 2.22 V | Green |
| 2.44 V or more | Blue |

That is, as the voltage applied to the liquid crystal cell 30 is increased, the display color of the above-described color liquid crystal display apparatus changes from "red" as an initial display color, obtained in a state wherein the applied voltage is 2.04 V or less, i.e., the liquid crystal molecules are twist-aligned, to "blue" as a final display color, obtained in a state wherein a voltage of 2.44 V or more as the maximum voltage is applied to the liquid crystal cell 30, i.e., the liquid crystal molecules are raised/aligned vertically. In this process of color change, the display color becomes "green" having a high light intensity and high color purity.

By controlling the voltage applied to the liquid crystal cell 30 in this manner, a display can be performed with a plurality of colors.

In addition, the above color liquid crystal display apparatus uses the retardation plate 92 which satisfies $n_x > n_z > n_y$ where $n_x$ is the refractive index in the x-axis direction 92a in which the refractive index is the maximum, $n_y$ is the refractive index of the y-axis direction, and $n_z$ is the refractive index in the z-axis direction. Since this retardation plate has a small change ratio of a phase difference to the incident angle of light as compared with a general retardation plate, the above color liquid crystal display apparatus has a small visual angle dependency of the display color and hence has a sufficiently large angle of field.

That is, phase differences $R_{xy}$ with respect the incident angle of light on the retardation plate in the x-axis and y-axis directions are obtained as follows. When light is incident from a direction along a normal line of the retardation plate (a line perpendicular to a plane including the x- and y-axes), i.e., the incident angle of light with respect to a normal line of the retardation plate is 0°, a phase difference $R_{xy}(0)$ is given by:

$$R_{xy}(0) = (n_x - n_y)d \quad . \tag{12}$$

where d is the thickness of the retardation plate.

When light is obliquely incident from a direction inclined with respect to a normal line of the phase difference angle by an angle θ, a phase difference $R_{xy}(\theta)$ is given by:

$$R_{xy}(\theta) = \left( n_x - \frac{n_y n_z}{\sqrt{n_y^2 \sin^2\theta + n_z^2 \cos^2\theta}} \right) \frac{d}{\cos\theta} \tag{13}$$

A general retardation plate is designed to satisfy $n_x > n_y = n_z$ where $n_x$, $n_y$, and $n_z$ are the refractive indexes in the x-axis, y-axis, and z-axis directions, as shown in FIG. 22. For this reason, in the general retardation plate, a ratio $R_{xy}(\theta)/R_{xy}(0)$ of the phase difference $R_{xy}(0)$, obtained when the incident angle of light is 0°, to the phase difference $R_{xy}(\theta)$, obtained when the incident angle of light is θ°, greatly changes depending on the incident angle of light.

In contrast to this, the retardation plate in the above embodiment is designed to satisfy $n_x > n_z > n_y$ where $n_x$, $n_y$, and $n_z$ are the refractive indexes in the x-axis, y-axis, and z-axis directions. For this reason, a change in ratio $R_{xy}(\theta)/R_{xy}(0)$ is small, and hence a change in phase difference with a change in incident angle of light is small.

Figure 23:
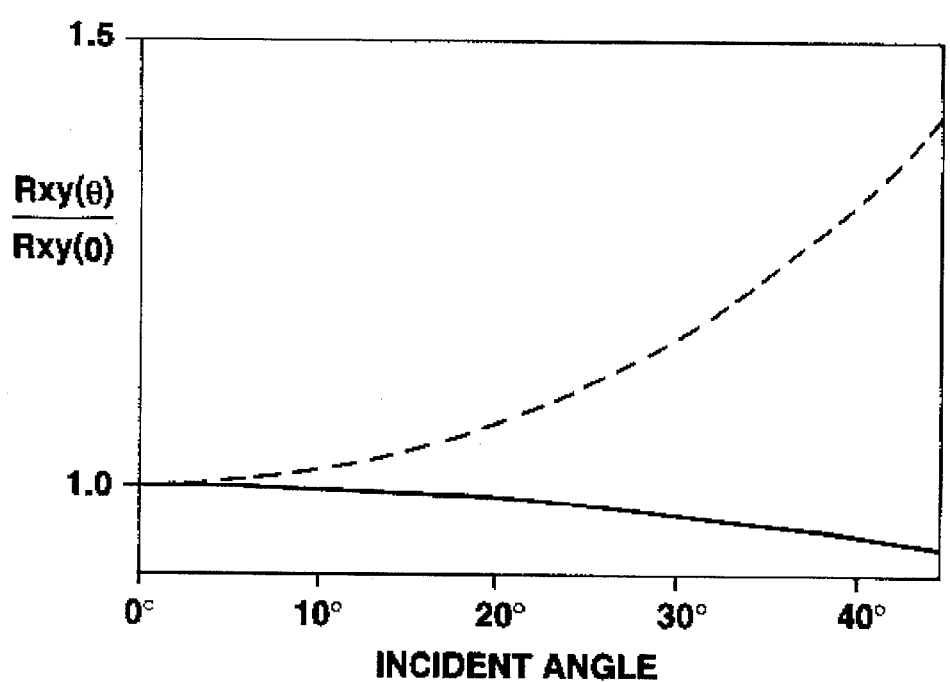
FIG. 23 is a graph showing the relationship between the retardation ratio for a retardation at an incident angle of 0° and the incident angle in the retardation plate used in the fourth embodiment and that in a general retardation plate.

FIG. 23 shows a change in $R_{xy}(\theta)/R_{xy}(0)$ as a function of the incident angle in the retardation plate in the above embodiment in comparison with the above-mentioned general retardation plate. As indicated by the broken curve in FIG. 23, the ratio $R_{xy}(\theta)/R_{xy}(0)$ of the general retardation plate greatly changes with a change in incident angle. For this reason, as the incident angle increases, the phase difference greatly changes. In contrast to this, as indicated by the solid curve in FIG. 23, the change in $R_{xy}(\theta)/R_{xy}(0)$ of the retardation plate in the above embodiment is small. Therefore, a change in phase difference with a change in incident angle is small.

Note that the values $R_{xy}(\theta)/R_{xy}(0)$ of the general retardation plate shown in FIG. 23 are obtained when the retardation plate is designed to have $n_x=1.4$ and $n_y=n_z=1.2$, and the values of $R_{xy}(\theta)/R_{xy}(0)$ of the retardation plate in the embodiment are obtained when the retardation plate is designed to have $n_x=1.4$ and $n_y=1.2$, and $n_z=1.3$.

As described above, in the general retardation plate, a change in phase difference with a change in incident angle is large. For this reason, if the general retardation plate is used for the above color liquid crystal display apparatus, the display color changes depending on the visual angle. In contrast to this, in the retardation plate in the above embodiment, a change in phase difference with a change in incident angle is small. If, therefore, this retardation plate is used, a change in display color with a change in visual angle, i.e., the visual angle dependency of the display color, is small.

Figure 24:
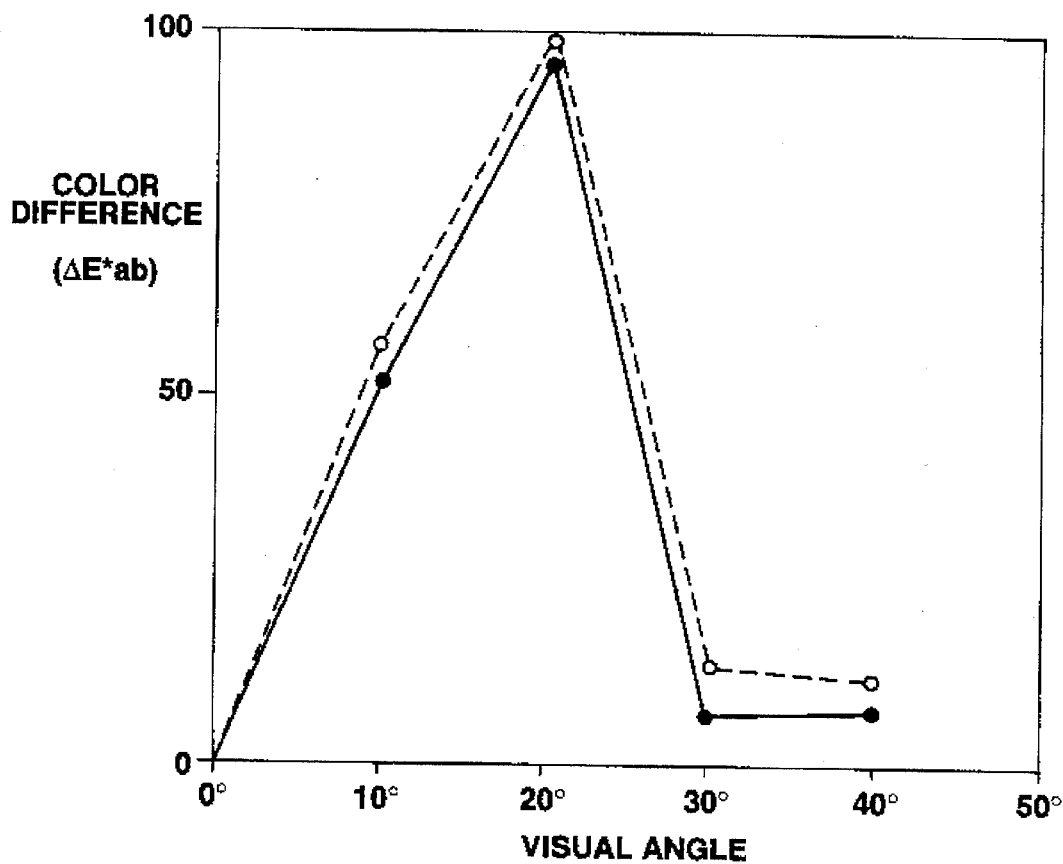
FIG. 24 is a graph showing a change in color difference as a function of the visual angle in the color liquid crystal display apparatus of the fourth embodiment and that in a comparative apparatus using a general retardation plate.

FIG. 24 shows the relationship between the visual angle and the color difference (ΔE*ab) of the display color in the color liquid crystal display apparatus of the above embodiment using the retardation plate 92 which satisfies $n_x>n_z>n_y$ where $n_x$, $n_y$, and $n_z$ are the refractive indexes in the x-axis, y-axis, and z-axis directions, and those in a comparative apparatus using the general retardation plate, which satisfies $n_x>n_y=n_z$, in place of the retardation plate 92. Referring to FIG. 24, the sold curve indicates a change in color difference as a function of the visual angle in the apparatus of the embodiment; and the broken curve, a change in color difference as a function of the visual angle in the comparative apparatus.

In both the apparatus of the embodiment and the comparative apparatus, the liquid crystal molecule twist angle of the liquid crystal cell is set to be 250°; the birefringent index Δn of the liquid crystal, 0.13; the liquid crystal layer thickness, 6.8 μm; the angular difference between the transmission axis of the upper polarizing plate and the phase delay axis of the retardation plate, 135°; the angular difference between the transmission axis of the upper polarizing plate and the liquid crystal molecule aligning direction of the liquid crystal cell on the upper substrate side, 125°; and the angular difference between the transmission axis of the lower polarizing plate and the transmission axis of the upper polarizing plate, 10°. In addition, the retardation plate used for the apparatus of the embodiment has $n_x=1.4$, $n_y=1.2$, and $n_z=1.3$, whereas the retardation plate used for the comparative apparatus has $n_x=1.4$ and $n_y=n_z=1.2$. Note that either retardation plate has a thickness of 2.15 μm.

Furthermore, the color difference (ΔE*ab) of the display color represents a value with reference to a chromaticity obtained when the visual angle is 0°, i.e., when the display apparatus is viewed in front of it. That is, the color difference is the difference between this reference chromaticity and the chromaticity of a display color at each visual angle.

As shown in FIG. 24, in the comparative apparatus using the general retardation plate which satisfies $n_x>n_y=n_z$ where $n_x$, $n_y$, and $n_z$ are the refractive indexes in the x-axis, y-axis, and z-axis directions, a change in chromaticity with a change in visual angle is large. That is, the visual angle dependency of the display color is large. In contrast to this, in the apparatus of the embodiment using the retardation plate which satisfies $n_x>n_z>n_y$, a change in chromaticity with a change in visual angle is smaller than that in the comparative apparatus.

In the above embodiment, the liquid crystal molecule twist angle of the liquid crystal cell 30 is set to be 250°. However, this liquid crystal molecule twist angle may be set within the range of 180° to 270°.

In addition, in the embodiment, the retardation plate 92 is disposed between the upper polarizing plate 41 and the liquid crystal cell 30. However, the retardation plate 92 may be disposed between the lower polarizing plate 42 and the liquid crystal cell 30. In the embodiment, two retardation plates, each identical to the retardation plate 92, may be arranged. In this case, the two retardation plates may be respectively disposed between the upper and lower polarizing plates 41 and 42 and the liquid crystal cell 30, or may be disposed between one polarizing plate 41 and the liquid crystal cell 30.

FIFTH EMBODIMENT

The fifth embodiment exemplifies the case wherein two retardation plates are disposed one on each side of an STN type liquid crystal cell.

Figure 25:
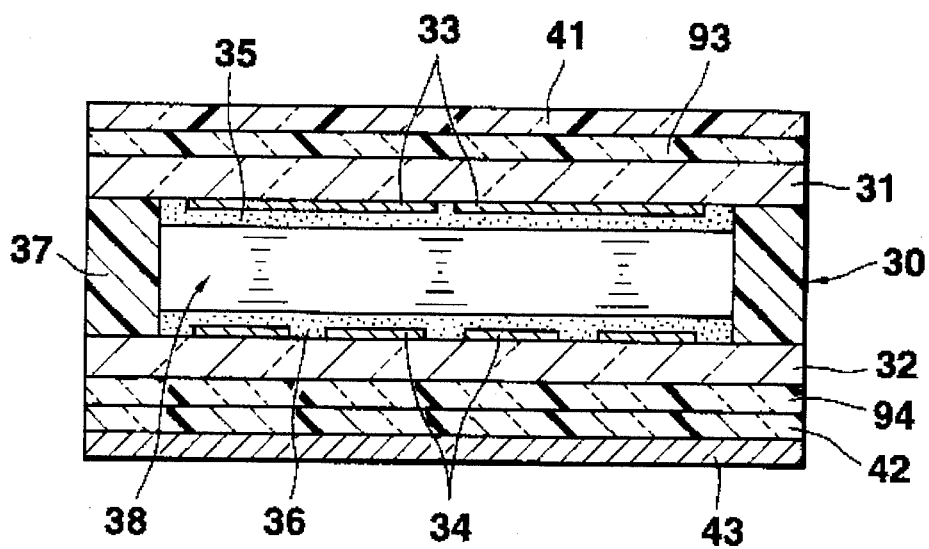
FIG. 25 is a sectional view showing a color liquid crystal display apparatus according to the fifth embodiment of the present invention.

A color liquid crystal display apparatus of this embodiment is designed as follows. As shown in FIG. 25, a pair of upper and lower polarizing plates 41 and 42 are disposed to sandwich a liquid crystal cell 30. A first retardation plate 93 is disposed between the liquid crystal cell 30 and the upper polarizing plate 41. A second retardation plate 94 is disposed between the liquid crystal cell 30 and the lower polarizing plate 42. In addition, a reflection plate 43 is disposed on the rear surface (lower surface) of the polarizing plate 42.

This liquid crystal cell 30 is of an STN type, in which the molecules of a liquid crystal 38 are twist-aligned at a twist angle of 180° to 270° between two substrates 31 and 32. In addition, the liquid crystal cell 30 is of a segment display type which is driven in a time-divisional manner. A transparent electrode 33 formed on an upper substrate 31 is divided into a plurality of common electrodes, whereas a transparent electrode 34 formed on a lower substrate 32 is divided into a plurality of segment electrodes, each having a shape corresponding to a display pattern.

Of the two retardation plates 93 and 94, the incident-side retardation plate, i.e., the first retardation plate 93 disposed between the liquid crystal cell 30 and the polarizing plate 41, is arranged such that its optical axis obliquely crosses the transmission axis of the upper polarizing plate 41 at a predetermined angle. The retardation plate on the opposite side, i.e., the second retardation plate 94 disposed between the liquid crystal cell 30 and the lower polarizing plate 42, is arranged such that its optical axis is set in an arbitrary direction.

Figure 26:
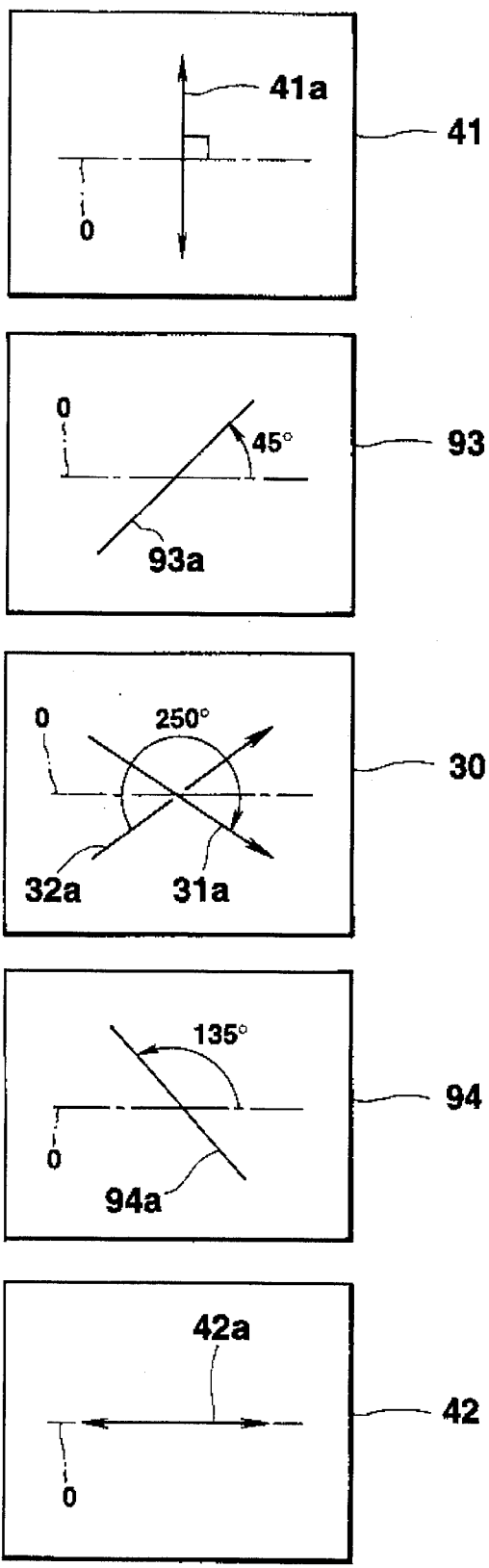
FIG. 26 is a chart for explaining the optical arrangement of the respective optical elements in the fifth embodiment.

Referring to FIG. 26, reference numeral 41a denotes a transmission axis of the polarizing plate 41; and 93a, an optical axis of the first retardation plate 93. In this embodiment, the transmission axis 41a of the upper polarizing plate 41 is set to be perpendicular to a reference line (horizontal line in FIG. 26) O, whereas the optical axis 93a of the first retardation plate 93 is shifted from the reference line O by 45° in the counterclockwise direction in FIG. 26. Accordingly, the angular difference between the optical axis 93a of the first retardation plate 93 and the transmission axis 41a of the upper polarizing plate 41 is set to be 45°.

In addition, referring to FIG. 26, reference numeral 94a denotes an optical axis of the second retardation plate 94. In this embodiment, the optical axis 94a of the second retardation plate 94 is shifted from the reference line O by 135° in the counterclockwise direction in FIG. 26, so that the optical axis 93a of the first retardation plate 93 and the optical axis 94a of the second retardation plate 94 are set to be perpendicular to each other.

In this color liquid crystal display apparatus, incident light is linearly polarized by the upper polarizing plate 41 and is elliptically polarized by the polarizing effect of the first retardation plate 93 in the process of passing therethrough. The elliptically polarized light is then set in a different polarized state owing to the polarizing effect of the STN type liquid crystal cell 30 in the process of passing therethrough. Furthermore, the light is set in a different polarized state owing to the polarizing effect of the second retardation plate 94 in the process of passing therethrough.

For this reason, light which is incident on the lower polarizing plate 42 through the first retardation plate 93, the liquid crystal cell 30, and the second retardation plate 94 is constituted by elliptically polarized light components which are respectively set in different polarized states in accordance with their wavelengths owing to the polarizing effects of the two retardation plates 93 and 94 and the liquid crystal cell 30. Of these elliptically polarized light components, only transmission axis light components are transmitted through the lower polarizing plate 42 to become colored light.

The colored light transmitted through the lower polarizing plate 42 is reflected by the reflection plate 43 to emerge from the upper surface side of the display apparatus in a reverse optical path to that described above. As a result, a display pattern is displayed with this colored light.

In this case, the colored light reflected by the reflection plate 43 is constituted by only the transmission axis component light, of the elliptically polarized light components obtained by the polarizing effects of the retardation plates 93 and 94 and the liquid crystal cell 30, which are transmitted through the lower polarizing plate 42. Most of this light is transmitted through the second retardation plate 94, the liquid crystal cell 30, and the first retardation plate 93 again. In this process, the light is influenced by the polarizing effects again, and the amount of transmission axis component light, of wavelength components having a low component ratio, which can be transmitted through the upper polarizing plate 41 becomes smaller. As a result, the colored light which is transmitted through the upper polarizing plate 41 and emerges therefrom becomes light having higher color purity than the colored light reflected by the reflection plate 43.

As described above, the color liquid crystal display apparatus is designed to produce transmitted colored light without using any color filter, and can sufficiently increase the brightness of a display by increasing the transmittance.

In the conventional color liquid crystal display apparatus, since the display color of each of the intersections between the electrodes of the liquid crystal cell is determined by the color of a color filter disposed at each intersection, only one display color can be displayed at each intersection. In contrast to this, in the color liquid crystal display apparatus of the above embodiment, colored light components are obtained by the polarizing effects of the two retardation plates 93 and 94 and by the polarizing effects of the retardation plates 93 and 94 and the liquid crystal cell 30, and the color of light obtained by these polarizing effects changes in accordance with a voltage applied to the liquid crystal cell 30.

The display color of this color liquid crystal display apparatus is determined by the values of retardations Re1 and Re2 of the retardation plates 93 and 94, a value Δn·d and liquid crystal molecule twist angle of the liquid crystal cell 30, the angular difference between the transmission axis 41a of the upper polarizing plate 41 and the optical axis 93a of the first retardation plate 93, the direction of the optical axis 94a of the second retardation plate 94, the angular difference between the liquid crystal molecule aligning direction of the liquid crystal cell 30 and the optical axis 94a of the second retardation plate 94, and the directions of the transmission axes 41a and 42a of the upper and lower polarizing plates 41 and 42.

As shown in FIG. 26, assume that the angular difference between the transmission axis 41a of the upper polarizing plate 41 and the optical axis 93a of the first retardation plate 93 is 45°; the direction of the optical axis 94a of the second retardation plate 94 is perpendicular to the optical axis 93a of the first retardation plate 93; the angular difference between the reference line O and the liquid crystal molecule aligning direction 31a of the liquid crystal 30 on the upper substrate 31 side is 35° in the clockwise direction in FIG. 26; and the optical axes 41a and 42a of the upper and lower polarizing plates 41 and 42 are perpendicular to each other. In this case, for example, the retardations Re1 and Re2 of the first and second retardation plates 93 and 94 are set to be 1,350 nm, and the value Δn·d and liquid crystal molecule twist angle of the liquid crystal cell 30 are set to be 0.884 μm (Δn=0.13; d=6.8 μm) and 250°, respectively. When the liquid crystal molecules of the liquid crystal cell 30 are in an initial twist-aligned state, the display color is "yellow". When the liquid crystal molecules are raised/aligned vertically, the display color becomes "green". In addition, as the liquid crystal molecules are raised/aligned from the initial twist-aligned state, the display color becomes "black" with a high light intensity and high color purity.

Table 9 shows the relationship between the voltage applied to the liquid crystal cell 30 of the color liquid crystal display apparatus and the display color. In Table 9, the value of each applied voltage is an RMS voltage value applied between the electrodes 33 and 34 of the liquid crystal cell 30.

TABLE 9

| Applied Voltage | Voltage Value | Display Color |
|---|---|---|
| V1 | 1.90 V or less | Yellow |
| V2 | 2.20 to 2.60 V | Black |
| V3 | 4.80 V or more | Green |

As shown in Table 9, the display color of the above-described color liquid crystal display apparatus changes in accordance with the voltage applied to the liquid crystal cell 30. According to this color liquid crystal display apparatus, therefore, the display color of the same portion, i.e., a portion corresponding to the same segment electrode 34, can be changed to a plurality of colors by controlling the voltage applied between the electrodes 33 and 34 of the liquid crystal cell 30.

The liquid crystal cell 30 may be of a simple matrix type or active matrix type. In such a case, the display color of each pixel can be changed to a plurality of colors.

In the above embodiment, the transmission axes 41a and 42a of the upper and lower polarizing plates 41 and 42 are arranged to be perpendicular to each other. However, the directions of the transmission axes 41a and 42a of the polarizing plates 41 and 42 may be arbitrarily set. In addition, the retardations Re1 and Re2 of the first and second retardation plates 93 and 94 need not be equal to each other.

SIXTH EMBODIMENT

The sixth embodiment exemplifies the case wherein two retardation plates are disposed on one side of an STN type liquid crystal cell.

Figure 27:
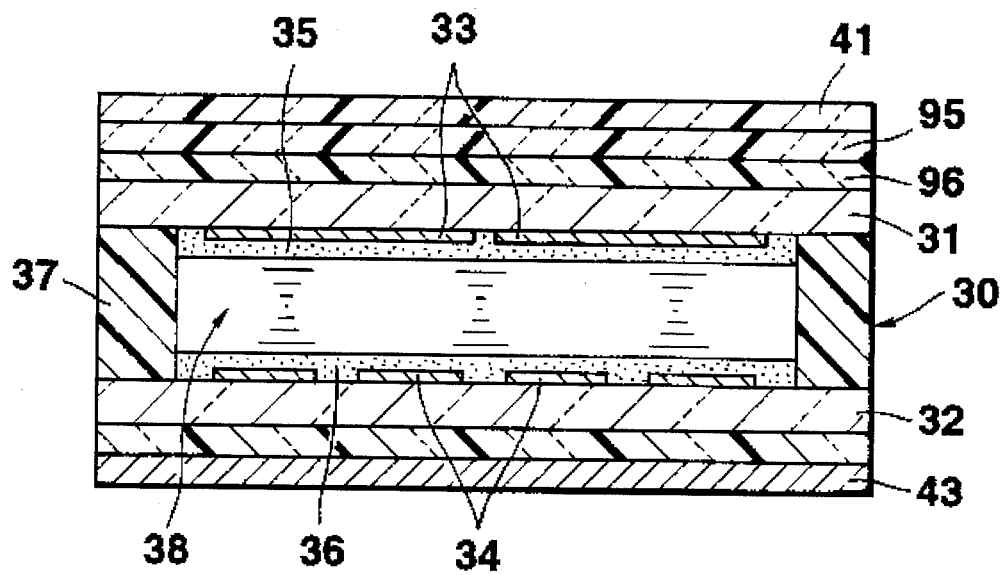
FIG. 27 is a sectional view showing a color liquid crystal display apparatus according to the sixth embodiment of the present invention.

A color liquid crystal display apparatus of this embodiment is designed as follows. As shown in FIG. 27, a pair of upper and lower polarizing plates 41 and 42 are disposed to sandwich a liquid crystal cell 30. Two retardation plates 95 and 96 are stacked on each other between the liquid crystal cell 30 and one of the polarizing plates, e.g., the upper polarizing plate 41. In addition, a reflection plate 43 is disposed on the rear surface (lower surface) of the lower polarizing plate 42.

Of the two retardation plates 95 and 96, the first retardation plate 95 is disposed on the upper polarizing plate 41 side such that its optical axis is obliquely shifted from the transmission axis of the polarizing plate 41 by a predetermined angle. The optical axis of the retardation plate 96 disposed on the liquid crystal cell 30 side is obliquely shifted from the optical axis of the first retardation plate 95 by a predetermined angle.

Figure 28:
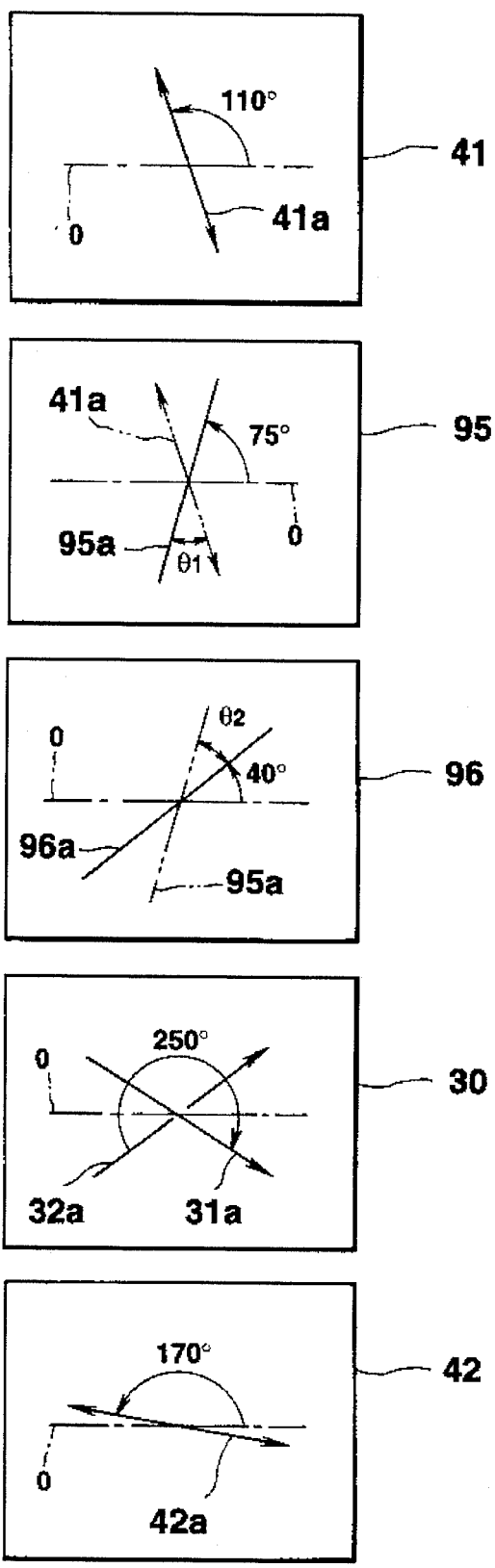
FIG. 28 is a view for explaining the optical arrangement of the respective optical elements in the sixth embodiment.

Referring to FIG. 28, reference numeral 41a denotes a transmission axis of the upper polarizing plate 41; 95a, an optical axis of the first retardation plate 95; and 96a, an optical axis of the second retardation plate 96. The optical axis 95a of the first retardation plate 95 obliquely cross the transmission axis 41a of the polarizing plate 41 at an angle θ1. The optical axis 96a of the second retardation plate 96 obliquely crosses the optical axis 95a of the first retardation plate 95 at an angle θ2.

Although the coloring and color changing effects of the color liquid crystal display apparatus of this embodiment are almost the same as those of the fifth embodiment, the relationship between the applied voltage and the display color is different from that in the fifth embodiment because of the different arrangement of the two retardation plates 95 and 96.

Assume that the angular difference θ1 between the transmission axis 41a of the upper polarizing plate 41 and the optical axis 95a of the first retardation plate 95 is 35°; the angular difference θ2 between the optical axis 95a of the first retardation plate 95 and the optical axis 96a of the second retardation plate 96 is 35°; the angular difference between the reference line O and the liquid crystal molecule aligning direction 31a of the liquid crystal 30 on the upper substrate 31 side (the substrate adjacent to the retardation plate) 31 side is 35° in the clockwise direction in FIG. 28 (the angular difference between the optical axes 95a and 96a of the first and second retardation plates 95 and 96 is 75°); the angular difference between the reference line O and the transmission axis 41a of the upper polarizing plate 41 is 110" in the counterclockwise direction in FIG. 28; and the angular difference between the reference line O and the transmission axis 42a of the polarizing plate 42 is 170" in the counterclockwise direction in FIG. 28. In this case, for example, retardations Re1 and Re2 of the first and second retardation plates 95 and 96 are set to be 1,200 nm, and a value Δn·d and liquid crystal molecule twist angle of the liquid crystal cell 30 are set to be 0.884 μm (Δn=0.13; d=6.8 μm) and 250", respectively. When the liquid crystal molecules of the liquid crystal cell 30 are in an initial twist-aligned state, the display color is "red". When the liquid crystal molecules are raised/aligned almost vertically, the display color becomes "green". In addition, as the liquid crystal molecules are raised/aligned from the initial twist-aligned state, the display color becomes "blue" with a high light intensity and high color purity.

Table 10 shows the relationship between the voltage applied to the liquid crystal cell 30 of the color liquid crystal display apparatus and the display color. In Table 10, the value of each applied voltage is an RMS voltage value applied between the electrodes 33 and 34 of the liquid crystal cell 30.

TABLE 10

| Applied Voltage | Voltage Value | Display Color |
| --- | --- | --- |
| V1 | 2.00 V or less | Red |
| V2 | 2.16 to 2.20 V | Blue |
| V3 | 2.28 V or more | Green |

As shown in Table 10, the display color of the above-described color liquid crystal display apparatus changes in accordance with the voltage applied to the liquid crystal cell 30. According to this color liquid crystal display apparatus, therefore, the display color of the same portion, i.e., a portion corresponding to the same segment electrode 34, can be changed to a plurality of colors by controlling the voltage applied between the electrodes 33 and 34 of the liquid crystal cell 30. Therefore, a bright color display can be obtained with a simple structure using no color filters.

SEVENTH EMBODIMENT

Figure 29:
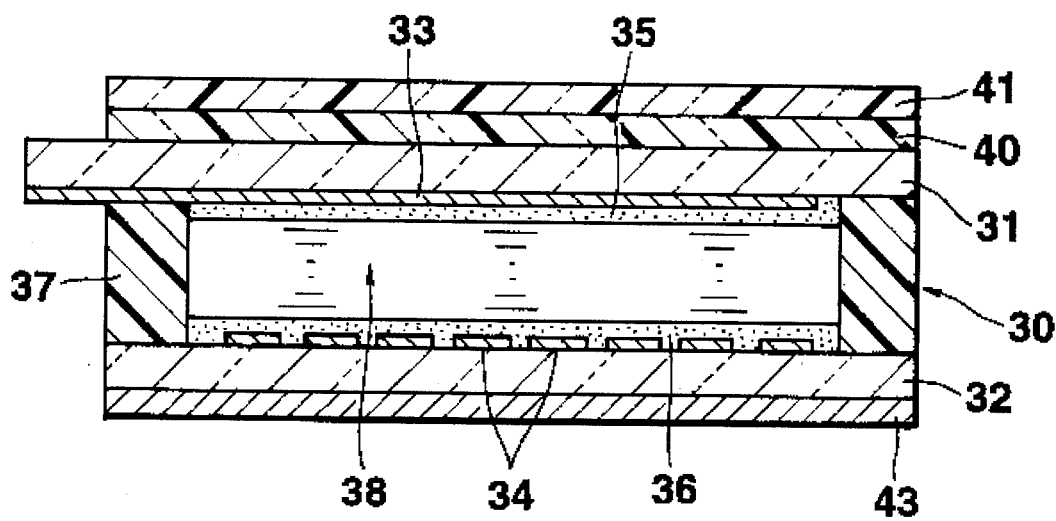
FIG. 29 is a sectional view showing a color liquid crystal display apparatus according to the seventh embodiment of the present invention.

As shown in FIG. 29, the arrangement of a color liquid crystal display apparatus of the seventh embodiment is the same as that of the second embodiment except that the polarizing plate on the reflection plate side is omitted.

As shown in FIG. 29, the color liquid crystal display apparatus of this embodiment comprises one dot matrix type STN liquid crystal cell 30, one retardation plate 40, one polarizing plate 41, and one reflection plate 43. The polarizing plate 41 is disposed on the front surface (upper surface in FIG. 29) side of the liquid crystal cell 30, and the reflection plate 43 is disposed on the rear surface (lower surface in FIG. 29) side of the liquid crystal cell 30. In addition, the retardation plate 40 is disposed between the liquid crystal cell 30 and the polarizing plate 41. In the embodiment, an STN liquid crystal cell having a liquid crystal molecule twist angle of 240° is used.

Figure 30:
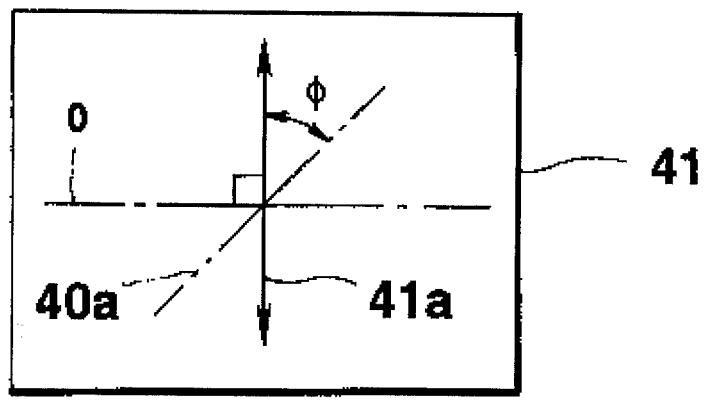
FIG. 30 is a view for explaining the optical arrangement of the respective optical elements in the seventh embodiment.
Figure 30:
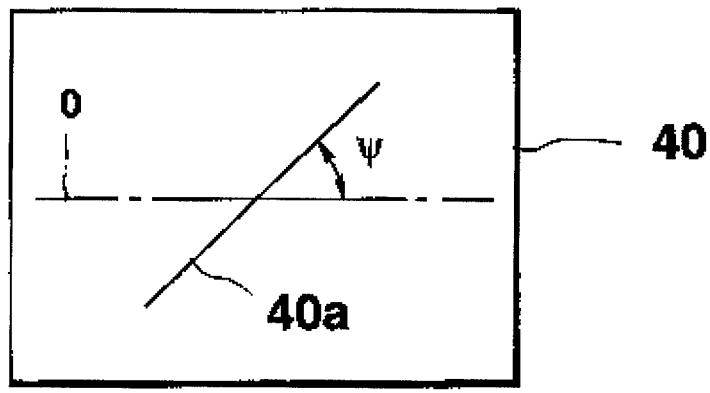
Figure 30:
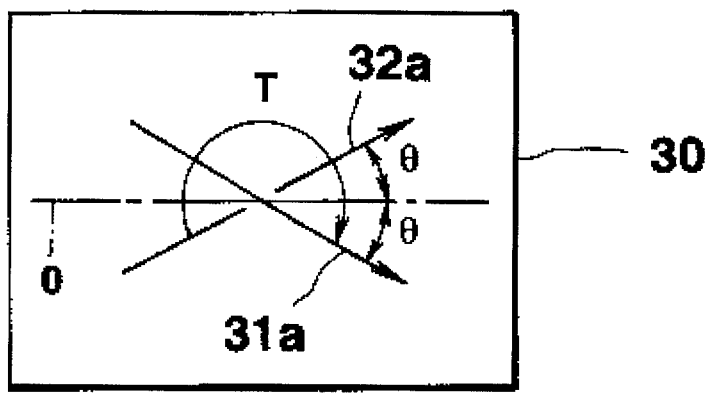

Referring to FIG. 30, reference numeral 41a denotes a transmission axis of the polarizing plate 41. In this embodiment, the polarizing plate 41 is arranged such that the transmission axis 41a is perpendicular to a reference line O (horizontal line in FIG. 30).

In this embodiment, an inclination angle ψ of the optical axis 40a of the retardation plate 40 with respect to the reference line O is set to be 45°, and an angular difference ϕ between the optical axis 40a of the retardation plate 40 and the transmission axis 41a of the polarizing plate 41 is set to be 45°.

The above color liquid crystal display apparatus is of a reflection type, in which light (natural light or light from an illumination source) which is incident from the front surface side of the apparatus is reflected by the reflection plate 43 on the rear surface side, thereby performing a display operation. The incident light from the front surface side passes through the polarizing plate 41, the retardation plate 40, and the liquid crystal cell 30 and is reflected by the reflection plate 43, and the reflected light passes through the liquid crystal cell 30, the retardation plate 40, and the polarizing plate 41 again to emerge.

In this color liquid crystal display apparatus, incident light which is linearly polarized by the polarizing plate 41 becomes elliptically polarized light owing to the polarizing effects of the retardation plate 40, whose optical axis 40a obliquely crosses the transmission axis 41a of the polarizing plate 41 at a predetermined angle (in this embodiment, $\phi=45°$), and the liquid crystal cell 30 in the process of passing therethrough. The light is then reflected by the reflection plate 43, and its polarized state is further changed in the process of passing through the liquid crystal cell 30 and the retardation plate 40 again.

That is to say, the light which is incident on the polarizing plate 41 again upon passing through the retardation plate 40 and the liquid crystal cell 30 is elliptically polarized light which has received the polarizing effects of the retardation plate 40 and the liquid crystal cell 30 twice. Therefore, of this light, only a transmission axis component light with respect to the polarizing plate 41 is transmitted through the polarizing plate 41. As a result, the emerging light is colored.

Since the polarizing effect of the liquid crystal cell 30 changes with a change in the aligned state of the liquid crystal molecules, the polarized state of light which is incident on the polarizing plate 41 upon receiving the polarizing effects of the retardation plate 40 and the liquid crystal cell 30 twice changes with a change in the liquid crystal molecule aligned state of the liquid crystal cell 30. Therefore, by changing the liquid crystal molecule aligned state of the liquid crystal cell 30, the color of light emerging from the polarizing plate 41 can be changed.

As described above, the above color liquid crystal display apparatus is designed to perform coloring of transmitted light without using any color filters, and a sufficiently bright color display can be obtained even in a reflection type by increasing the transmittance. In addition, if a driving voltage for selectively displaying a plurality of colors is applied to each pixel portion of the liquid crystal cell 30, the display color of a portion corresponding to each pixel portion of the liquid crystal cell 30, i.e., the display color of each pixel, can be changed to a plurality of colors.

The display color of this color liquid crystal display apparatus is determined by a retardation Re of the retardation plate 40, a value $\Delta n \cdot d$ and liquid crystal molecule twist angle of the liquid crystal cell 30, an angular difference $\phi$ between the transmission axis 41a of the polarizing plate 41 and the optical axis 40a of the retardation plate 40, and an angular difference $(\psi-\theta)$ between the liquid crystal molecule aligning direction 31a of the liquid crystal cell 30 on the substrate 31 side adjacent to the retardation plate and the optical axis 40a of the retardation plate 40.

Assume that the angular difference $\phi$ between the transmission axis 41a of the polarizing plate 41 and the optical axis 40a of the retardation plate 40 is 45°; the angular difference $\psi-\theta$ between the liquid crystal molecule aligning direction 31a of the liquid crystal cell 30 and the optical axis 40a of the retardation plate 40 is 15°; the retardation Re of the retardation plate 40 is 930 nm; and the value $\Delta n \cdot d$ and liquid crystal molecule twist angle of the liquid crystal cell 30 are 0.83 μm and 240°, respectively. In this case, when the liquid crystal molecules of the liquid crystal cell 30 are in an initial twist-aligned state, the display color is "purple". When the liquid crystal molecules are raised/aligned almost vertically, the display color becomes "orange". In addition, as the liquid crystal molecules are raised/aligned from the initial twist-aligned state, the display color becomes "green" and "yellow" with a high light intensity and high color purity.

Table 11 shows the relationship between the voltage applied to the liquid crystal cell 30 of the color liquid crystal display apparatus and the display color. In Table 11, the value of each applied voltage is an RMS voltage value applied between electrodes 33 and 34 of the liquid crystal cell 30.

TABLE 11

| Applied Voltage | Voltage Value | Display Color |
| --- | --- | --- |
| V1 | 1.9 V or less | Purple |
| V2 | 2.3 V | Green |
| V3 | 2.6 V | Yellow |
| V4 | 3.2 V or more | Orange |

As described above, the color liquid crystal display apparatus of this embodiment can arbitrarily change the color of one display portion (one dot or one segment) by controlling the voltage applied to the liquid crystal cell 30. Therefore, according to the color liquid crystal display apparatus of the embodiment, a bright color display can be obtained with a simple structure without using any color filter.

In addition, the color liquid crystal display apparatus of this embodiment is constituted by only four components, i.e., one liquid crystal cell 30 having liquid crystal molecules twist-aligned, one retardation plate 40, one polarizing plate 41, and one reflection plate 43. Therefore, the apparatus can be realized with a simpler structure at a lower cost.

In this embodiment, the retardation plate 40 is disposed between the liquid crystal cell 30 and the polarizing plate 41. However, the retardation plate 40 may be disposed between the liquid crystal cell 30 and the reflection plate 43.

As the retardation plate 40, the retardation plate used in the fourth embodiment may be used. That is, the apparatus may use a retardation plate which satisfies $n_x > n_z > n_y$ where $n_x$ is the refractive index in the X-axis direction in which the refractive index is the maximum, $n_y$ is the refractive index in the Y-axis direction perpendicular to the X-axis direction within a plane parallel to the surface of the retardation plate, and $n_z$ is the refractive index in the Z-axis direction which is the direction of thickness. With this arrangement, the visual angle dependency is reduced, and a color liquid crystal display apparatus having a larger viewing angle and a simple structure can be obtained.

Furthermore, the number of retardation plates is not limited to one. For example, two retardation plates may be disposed one on each side of the liquid crystal cell or they may both be disposed between the liquid crystal cell and the polarizing plate.

If the twist angle of the liquid crystal cell 30 is increased to 250° to 260°, as in the second embodiment, the color liquid crystal display apparatus can display a dot matrix display pattern by a high time-division scheme.

Moreover, it is apparent that the same driving methods as those in the first and second embodiments, i.e., the pulse modulation methods such as the pulse width modulation method, the pulse height modulation method, and the active addressing method used in the second embodiment, and the method of allocating a predetermined number of frames in accordance with a display color, used in the first embodiment, and the active matrix driving method using TFTs in the third embodiment can be applied to the color liquid crystal display apparatus of this embodiment.

The first to seventh embodiments have been described in detail as preferred embodiments of the present invention. In these embodiments, the angle (angular difference) at which the optical axis of the retardation plate three-dimensionally crosses the transmission axis of the adjacent polarizing plate is set to be 45°. However, this angular difference is not limited to 45° and may be arbitrarily set in accordance with a display color to be obtained. However, in order to obtain a satisfactory color display effect by using the retardation plate, the angular difference $\psi$ is preferably set to be 35° to 55°.

All the apparatuses of the first to sixth embodiments are reflection type display apparatuses. However, transmission type color liquid crystal display apparatuses can be realized by omitting the reflection plates from these embodiments. In addition, color liquid crystal display apparatuses serving both as a reflection type and a transmission type can be realized by using half-mirror plates as reflection plates.

In addition, each retardation plate has two optical axes, namely a phase advance axis and a phase delay axis which are perpendicular to each other. However, either the phase advance axis or the phase delay axis may be used as an optical axis to cross the transmission axis of an adjacent polarizing plate by 35° to 55°.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 180° to 270° from one substrate to the other substrate;

a pair of polarizing plates disposed outside said pair of substrates to sandwich said substrates and respectively having transmission axes for linearly polarizing incident light;

a retardation plate having a maximum refraction index direction which is within a plane parallel to a surface of said retardation plate and having a value of retardation for coloring light transmitted through the liquid crystal display apparatus, in combination with the $\Delta n \cdot d$ of the liquid crystal layer, said retardation plate being disposed between said pair of polarizing plates such that an angle defined by said maximum refractive index direction, and the transmission axis of an adjacent one of said polarizing plates is 35° to 55°; and driving means, connected to said electrodes, for applying a voltage to said liquid crystal layer to change a polarized state of light transmitted through said liquid crystal layer so as to change a color of light transmitted through said polarizing plate on an exit side into plural colors including at least two chromatic colors.

2. An apparatus according to claim 1, further comprising another retardation plate disposed between said pair of polarizing plates.

3. An apparatus according to claim 2, wherein said another retardation plate is disposed between said retardation plate and one of said pair of polarizing plates which is adjacent thereto.

4. An apparatus according to claim 2, wherein said another retardation plate is disposed to be adjacent to one of said substrates which is on an opposite side to the other substrate to which said retardation plate is adjacent.

5. An apparatus according to claim 1, further comprising a reflection plate disposed outside one of said pair of polarizing plates.

6. An apparatus according to claim 5, further comprising another retardation plate disposed between said pair of polarizing plates.

7. An apparatus according to claim 6, wherein said another retardation plate is disposed between said retardation plate and said polarizing plate adjacent thereto.

8. An apparatus according to claim 6, wherein said another retardation plate is disposed outside one of said pair of substrates which is located on an opposite side to the other substrate to which said retardation plate is adjacent.

9. An apparatus according to claim 1, wherein said retardation plate is a retardation plate which satisfies $n_X > n_Z > n_Y$ where $n_X$, $n_y$, and $n_Z$ are refractive indexes in an X direction in which the refractive index is the maximum, a Y direction perpendicular to the X direction within a plane parallel to said retardation plate, and a Z direction of thickness, respectively.

10. An apparatus according to claim 1, wherein liquid crystal molecules of said liquid crystal layer are aligned to be twisted from one substrate to the other substrate at a twist angle of 250°.

11. An apparatus according to claim 1, wherein said pair of substrates include a plurality of electrodes formed on the opposing surfaces thereof to extend in orthogonal directions, and portions where electrodes respectively formed on the opposing surfaces oppose form a plurality of display dots arranged in the form of a matrix.

12. An apparatus according to claim 11, wherein said driving means includes driving voltage generating means for generating a plurality of voltages having different magnitudes, display signal generating means for generating a display signal corresponding to color data to be displayed, and display driving means for selecting a driving voltage in accordance with the display signal and forming a driving waveform.

13. An apparatus according to claim 1, wherein said driving means comprises means for generating a plurality of signal voltages corresponding to a plurality of predetermined different display colors, and applied voltage control means for selecting one of the plurality of signal voltages for each frame in accordance with color to be displayed in one period constituted by a predetermined number of frames, and applying a voltage corresponding to a display color to said liquid crystal layer.

14. An apparatus according to claim 1, further comprising pixel electrodes regularly arranged on one of said pair of substrates, and thin-film transistors arranged in correspondence with said respective pixel electrodes, each of said thin-film transistors having a source electrode connected to a corresponding one of said pixel electrodes, a drain electrode connected to a signal line for supplying a display signal, and a gate electrode connected to a scanning line for supplying a scanning signal.

15. A color liquid crystal display apparatus comprising::
   a pair of substrates having opposing surfaces, electrodes respectively formed on the opposing surfaces, and aligning films respectively formed to cover said electrodes, said aligning films having undergone aligning treatment in predetermined directions;
   a liquid crystal layer formed between said pair of substrates and having liquid crystal molecules aligned to be twisted at a twist angle of 180° to 270° from one substrate to the other substrate;
   a polarizing plate disposed outside one of said pair of substrates and having a transmission axis for linearly polarizing incident light;
   a reflection plate disposed on an opposite side to said polarizing plate with respect to said pair of substrates;
   a retardation plate having a maximum refractive index direction which is within a plane parallel to a surface of said retardation plate and having a value of retardation for coloring light transmitted through the liquid crystal display apparatus, in combination with the $\Delta n \cdot d$ of the liquid crystal layer, said retardation plate being disposed between said polarizing plate and said reflection plate such that an angle defined by said maximum refractive index direction, and the transmission axis of said polarizing plate is 35° to 55°; and
   driving means, connected to said electrodes, for applying a voltage to said liquid crystal layer to change a polarized state of light transmitted through said polarizing plate on an exit side into plural colors including at least two chromatic colors.

16. An apparatus according to claim 15, further comprising another retardation plate disposed between said polarizing plate and said reflection plate.

17. An apparatus according to claim 16, wherein said another retardation plate is disposed between said retardation plate and said polarizing plate.

18. An apparatus according to claim 16, wherein said another retardation plate is disposed to be adjacent to one of said substrates which is on an opposite side to the other substrate to which said retardation plate is adjacent.

19. An apparatus according to claim 15, wherein said retardation plate is a retardation plate which satisfies $n_X > n_Z > n_Y$ where $n_X$, $n_Y$, and $n_Z$ are refractive indexes in an X direction in which the refractive index is the maximum, a Y direction perpendicular to the X direction within a plane parallel to said retardation plate, and a Z direction of thickness, respectively.

20. An apparatus according to claim 15, wherein said liquid crystal layer has liquid crystal molecules aligned to be twisted from one substrate to the other substrate at a twist angle of 250°.

21. An apparatus according to claim 15, wherein said pair of substrates include a plurality of electrodes formed on the opposing surfaces thereof to extend in orthogonal directions, and portions where electrodes respectively formed on the opposing surfaces oppose form a plurality of display dots arranged in the form of a matrix.

22. An apparatus according to claim 21, wherein said driving means includes driving voltage generating means for generating a plurality of voltages having different magnitudes, display signal generating means for generating a display signal corresponding to color data to be displayed, and display driving means for selecting a driving voltage in accordance with the display signal and forming a driving waveform.

23. An apparatus according to claim 15, wherein said driving means comprises means for generating a plurality of signal voltages corresponding to a plurality of predetermined different display colors, and applied voltage control means for selecting one of the plurality of signal voltages for each frame in accordance with color to be displayed in one period constituted by a predetermined number of frames, and applying a voltage corresponding to a display color to said liquid crystal layer.

24. An apparatus according to claim 15, further comprising pixel electrodes regularly arranged on one of said pair of substrates, and thin-film transistors arranged in correspondence with said respective pixel electrodes, each of said thin-film transistors having a source electrode connected to a corresponding one of said pixel electrodes, a drain electrode connected to a signal line for supplying a display signal, and a gate electrode connected to a scanning line for supplying a scanning signal.

25. A color liquid crystal display apparatus for changing a display color in accordance with an applied voltage, comprising:
   a pair of substrates having opposing surfaces, electrodes respectively formed on the opposing surfaces, and aligning films respectively formed to cover said electrodes, said aligning films having undergone aligning treatment in predetermined directions;
   a liquid crystal layer formed between said pair of substrates and having liquid crystal molecules aligned to be twisted at a twist angle of 180° to 270° from one substrate to the other substrate;
   a pair of polarizing plates disposed outside said pair of substrates to sandwich said substrates and respectively having transmission axes for linearly polarizing incident light;
   a retardation plate having a maximum refractive index direction which is within a plane parallel to a surface of said retardation plate and having a value of retardation for coloring light transmitted through the liquid crystal display apparatus, in combination with the $\Delta n \cdot d$ of the liquid crystal layer, said retardation plate being disposed to be adjacent to one of said pair of polarizing plates which is located on an incident side, for elliptically polarizing linearly polarized light transmitted through said one of said pair of polarizing plates; and
   driving means, connected to said electrodes, for applying at least three different voltages to said liquid crystal layer to change a polarized state of light transmitted through said liquid crystal layer so as to change a display color to at least three colors including at least two chromatic colors.

* * * * *